Jan. 18, 1938.    R. V. GRAVES ET AL    2,105,731
COMPOSING MACHINE
Original Filed Jan. 23, 1931    23 Sheets-Sheet 8
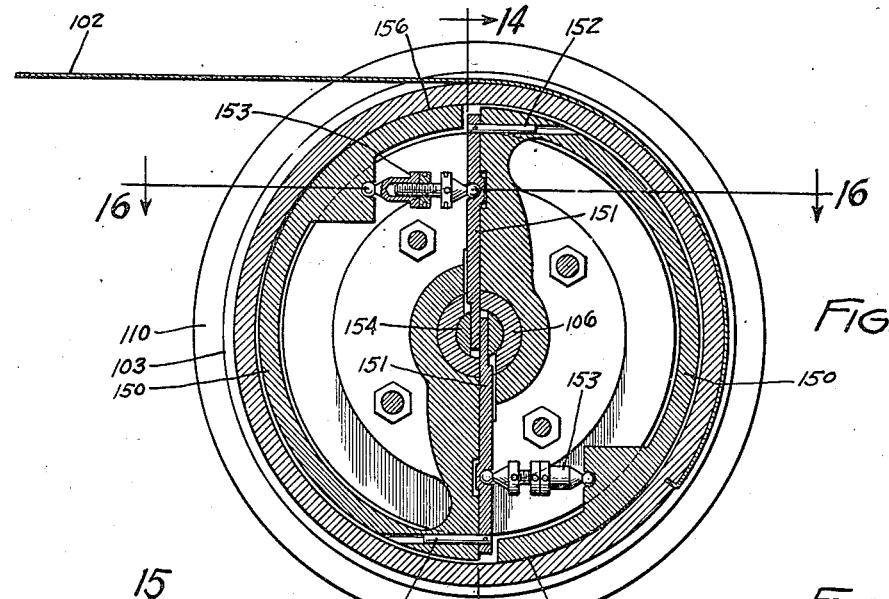
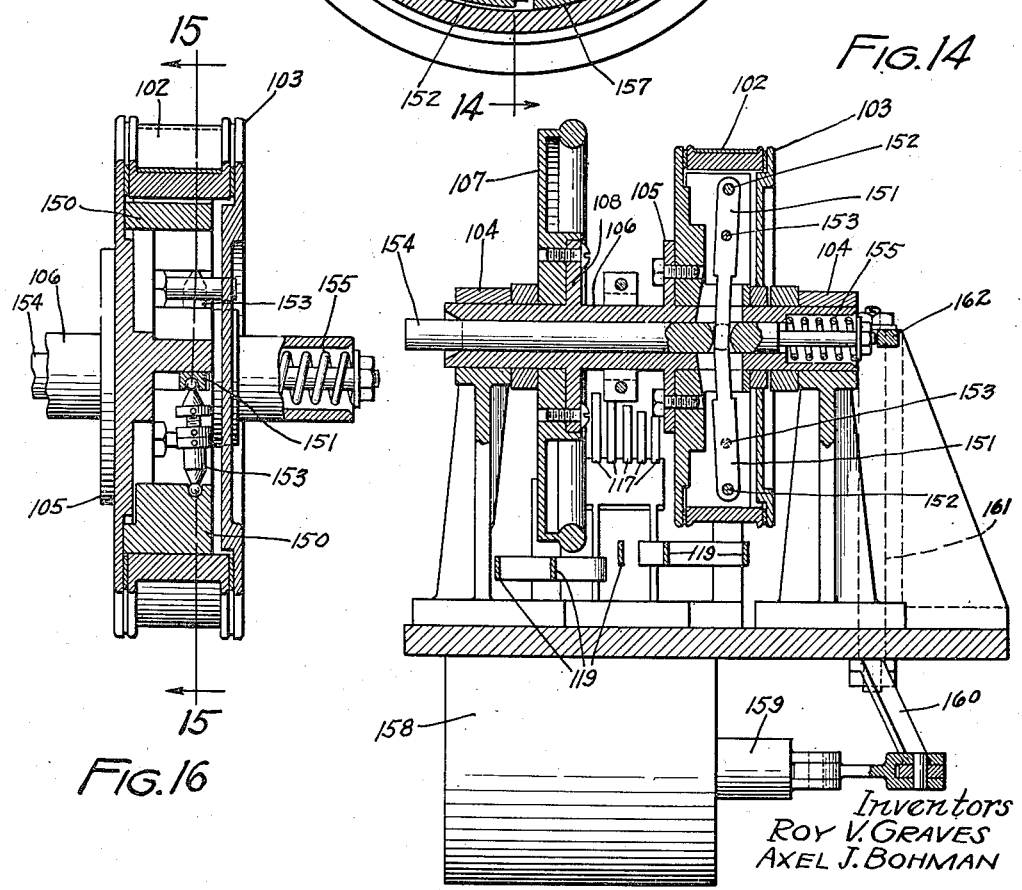

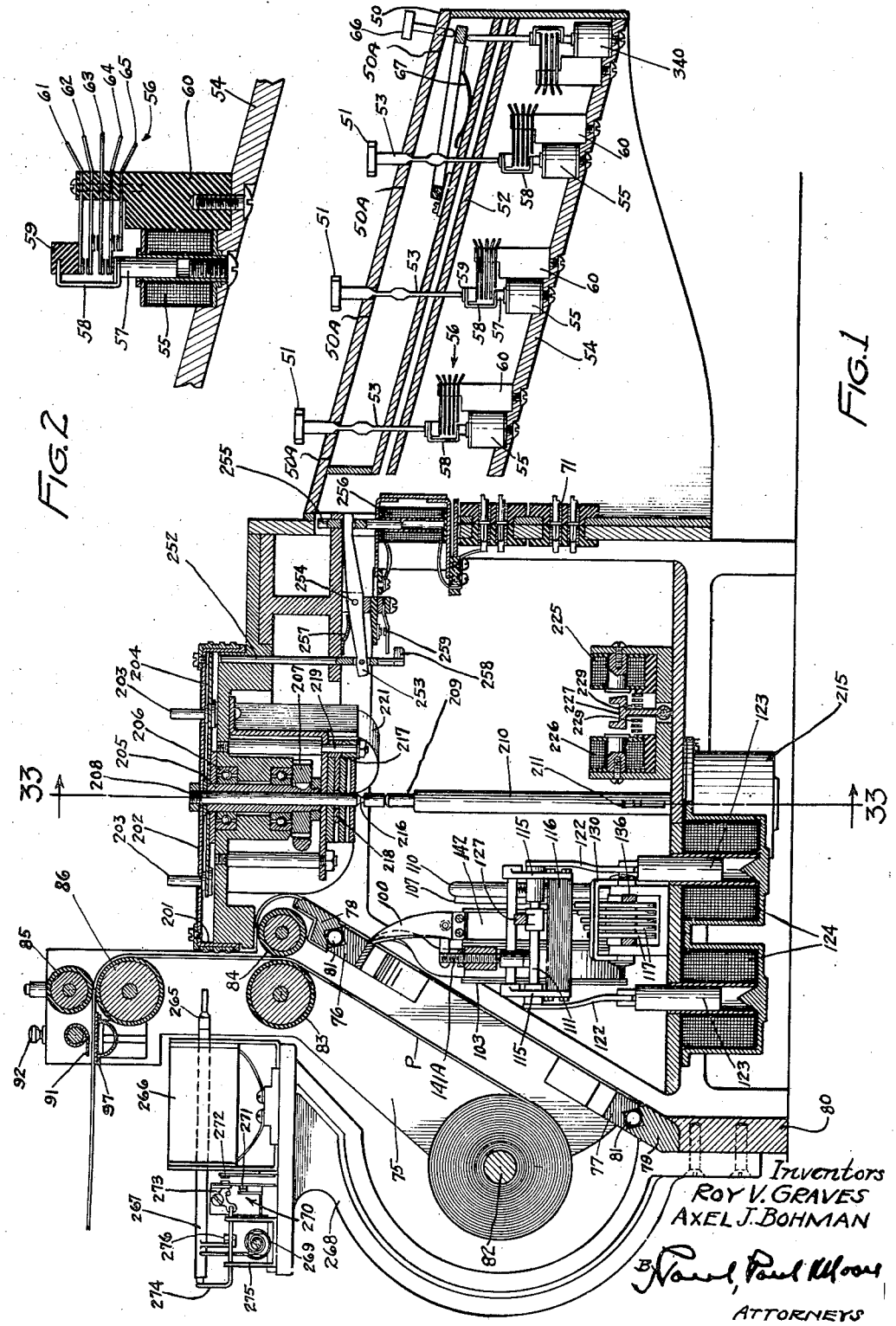

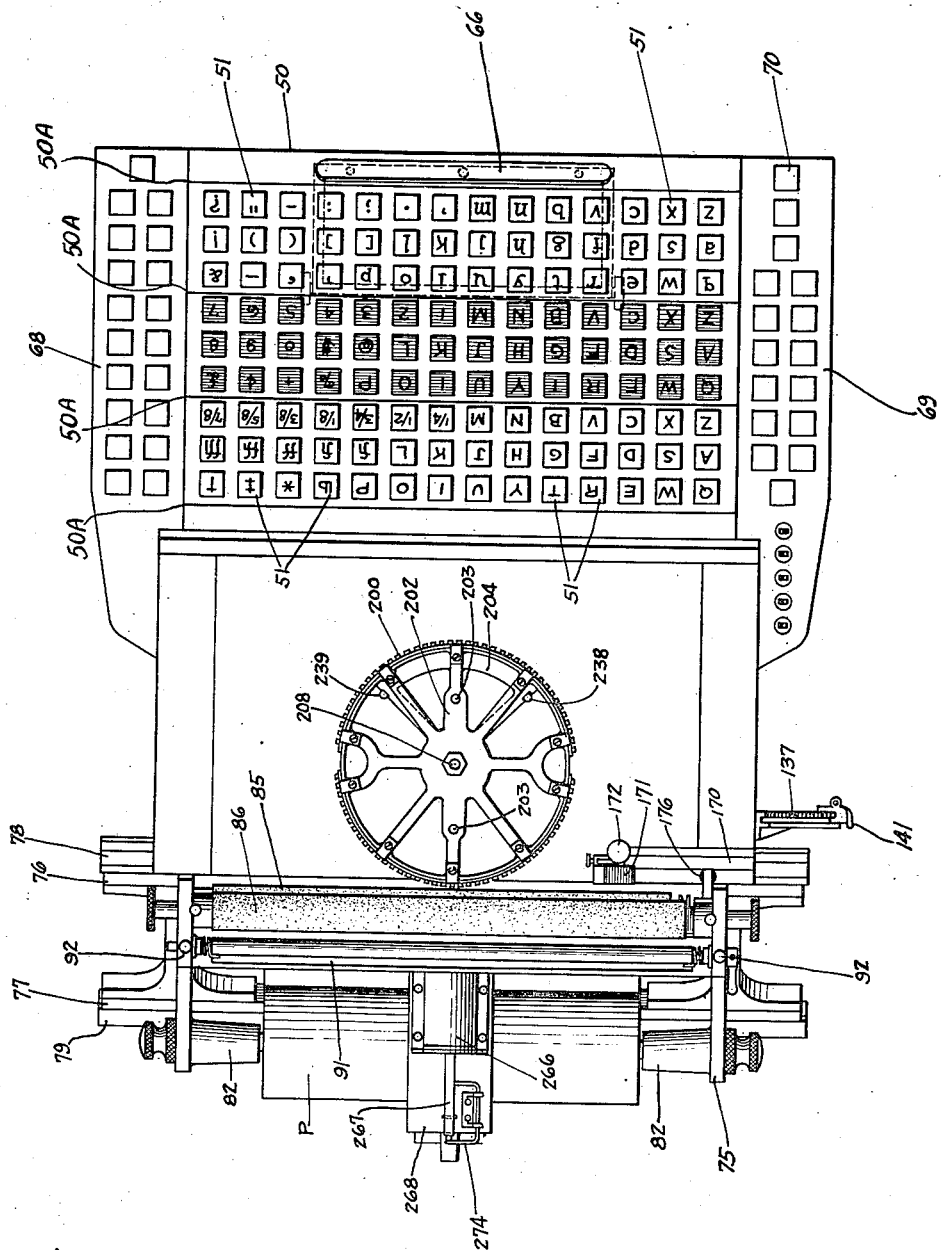

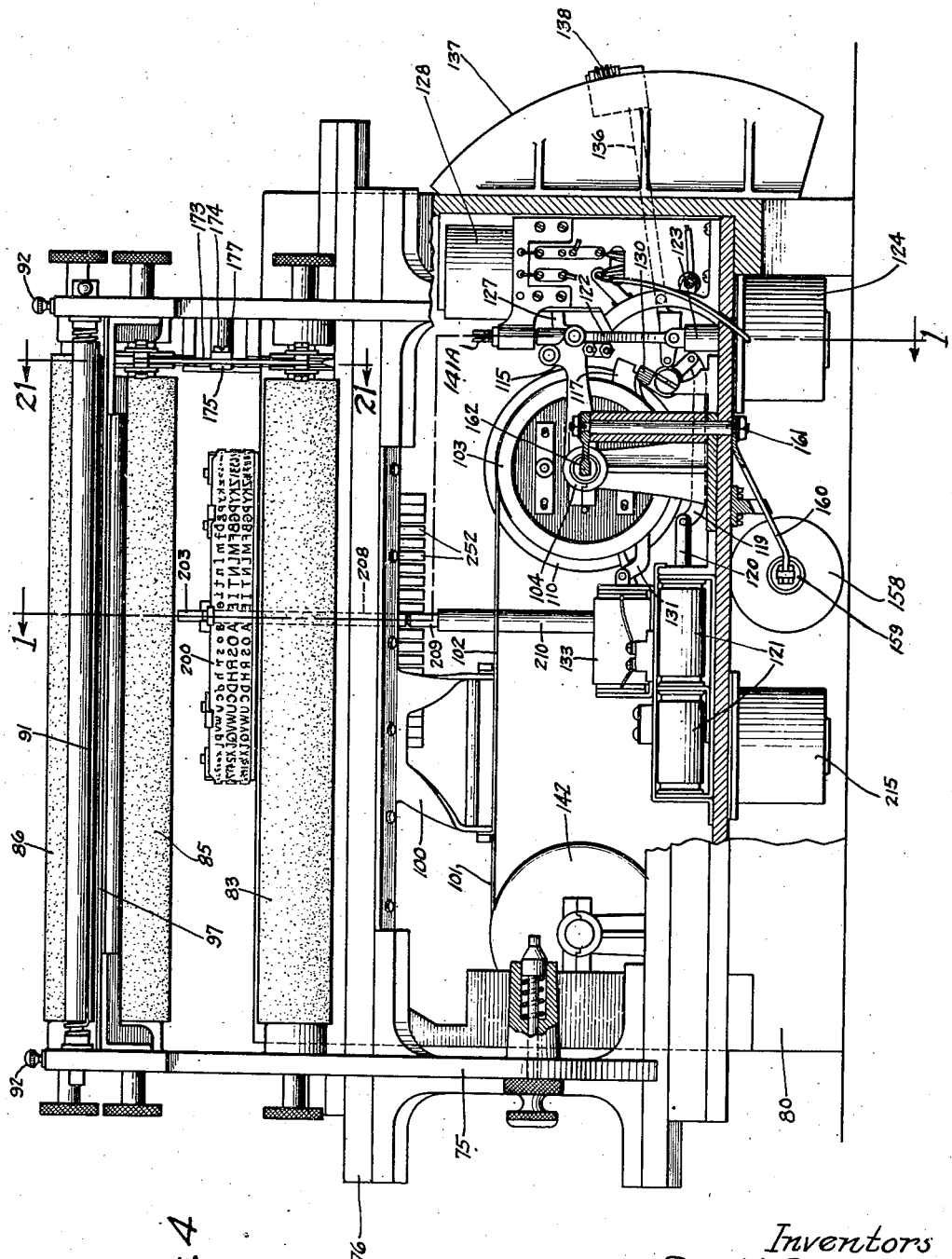

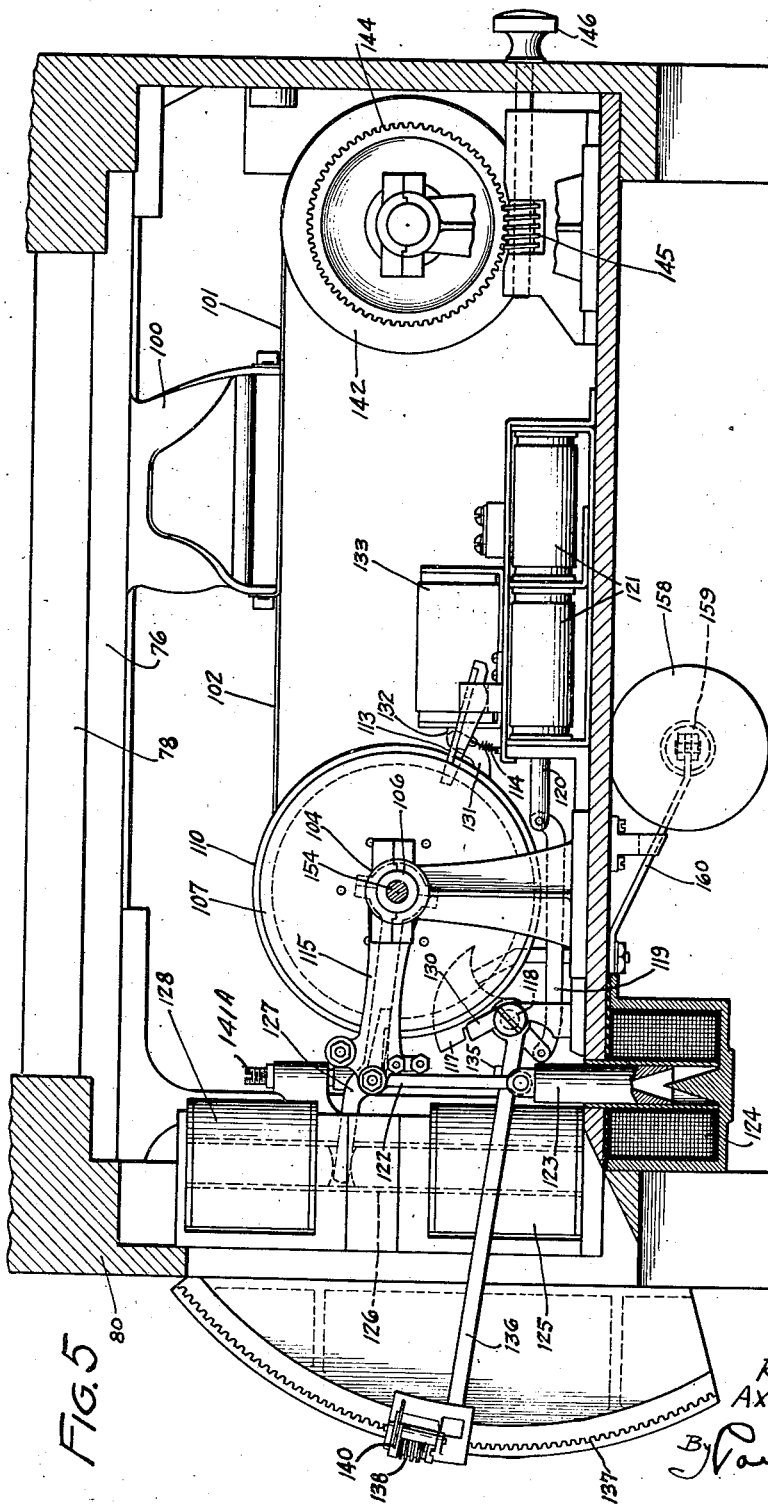

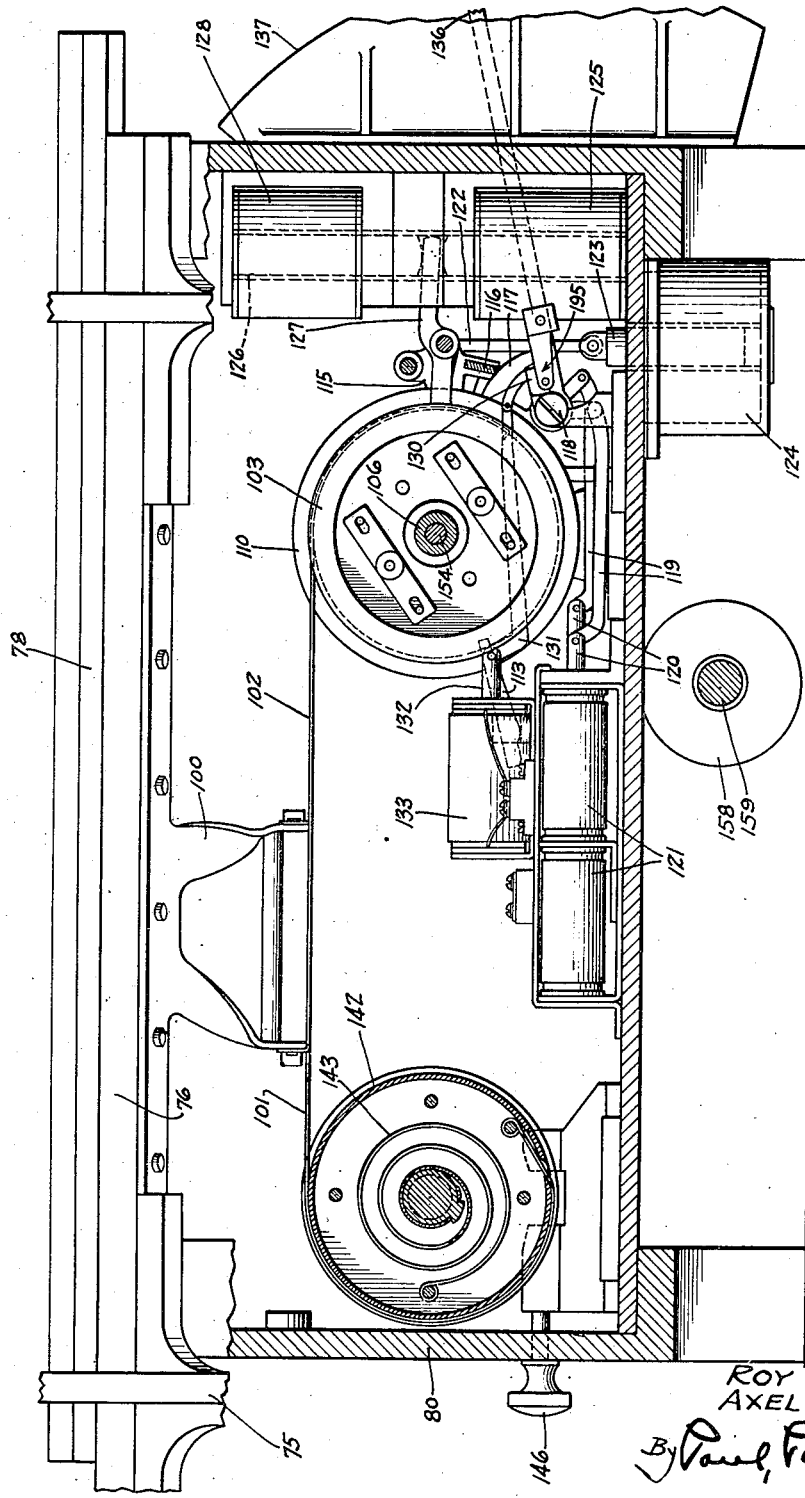

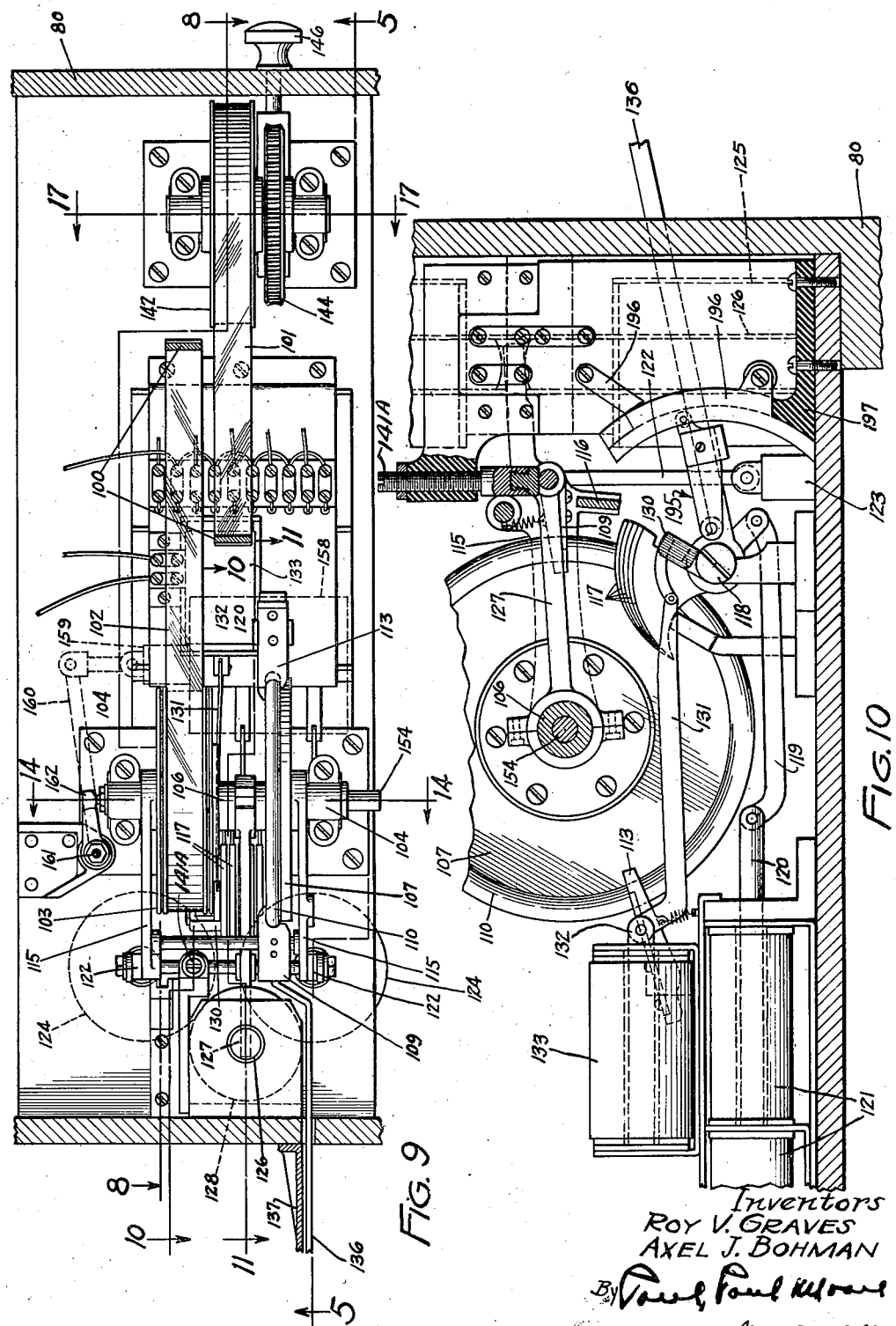

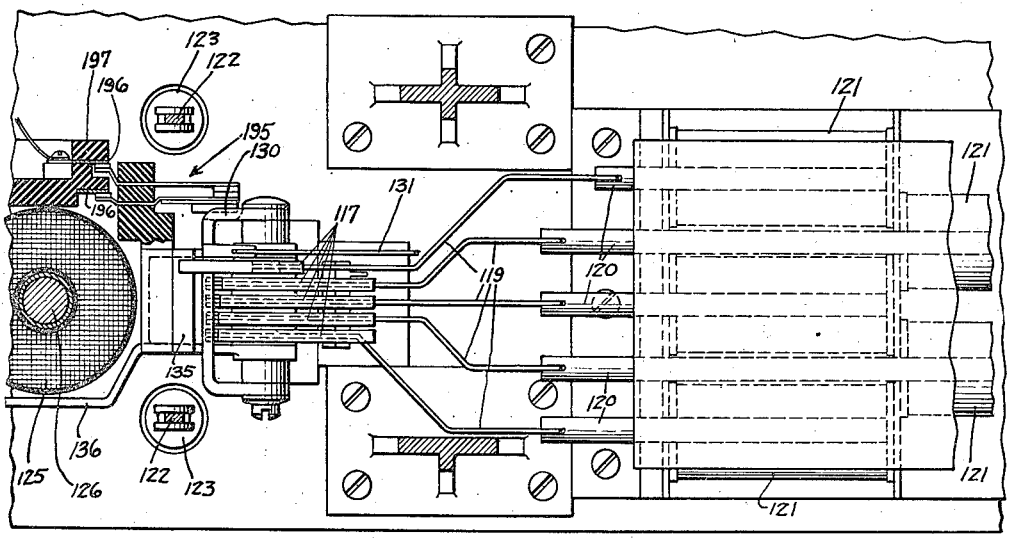
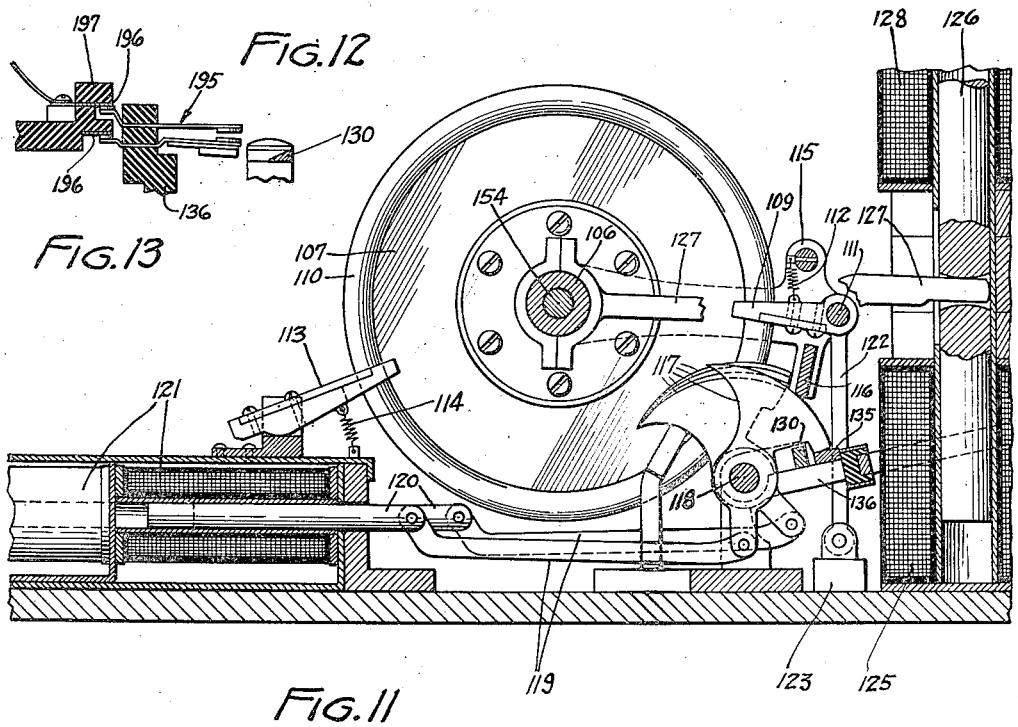

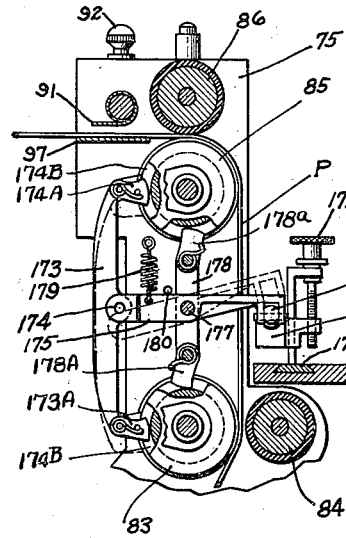
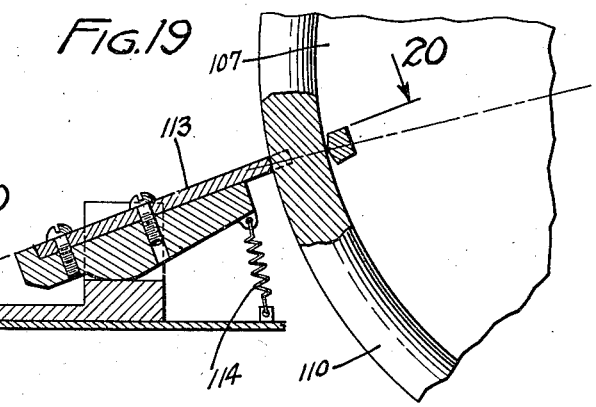
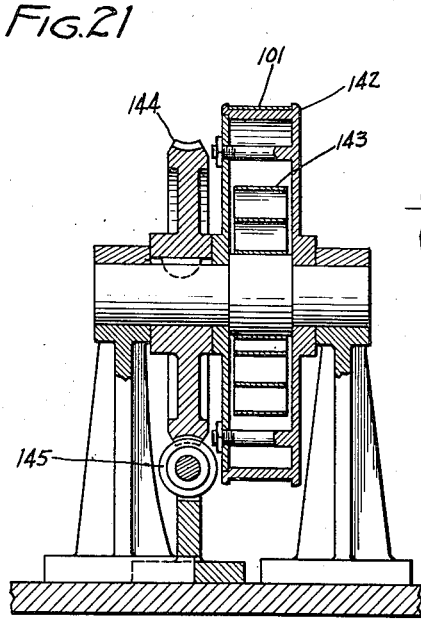
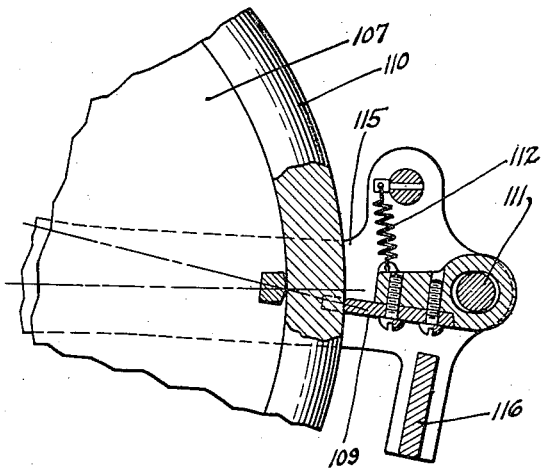
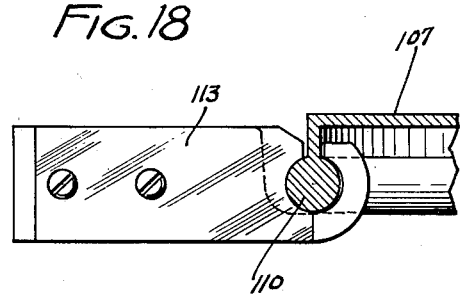

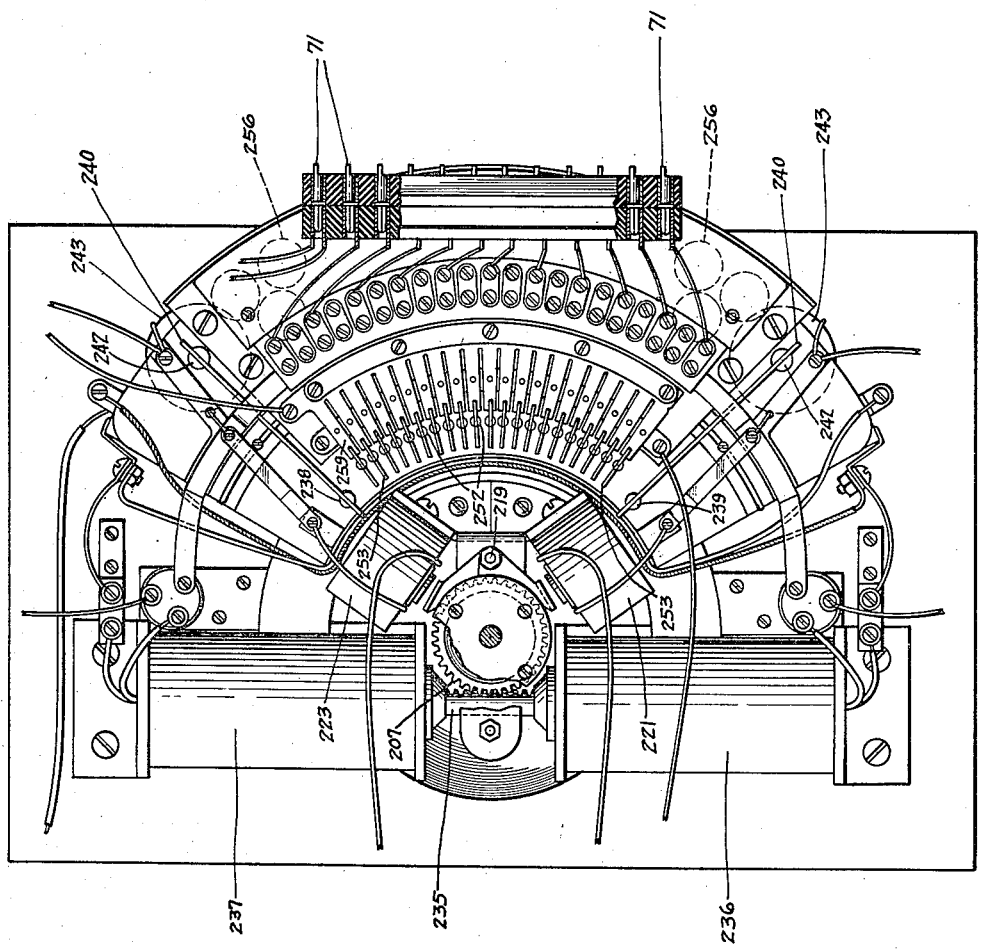

Jan. 18, 1938.  R. V. GRAVES ET AL  2,105,731
COMPOSING MACHINE
Original Filed Jan. 23, 1931   23 Sheets-Sheet 11
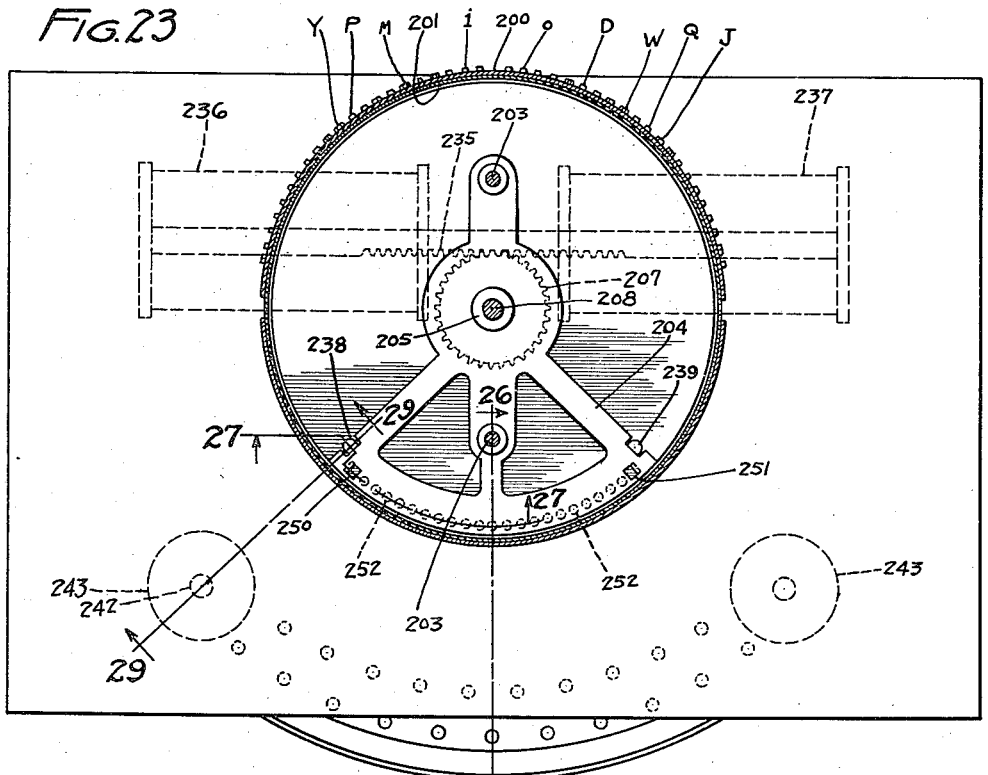
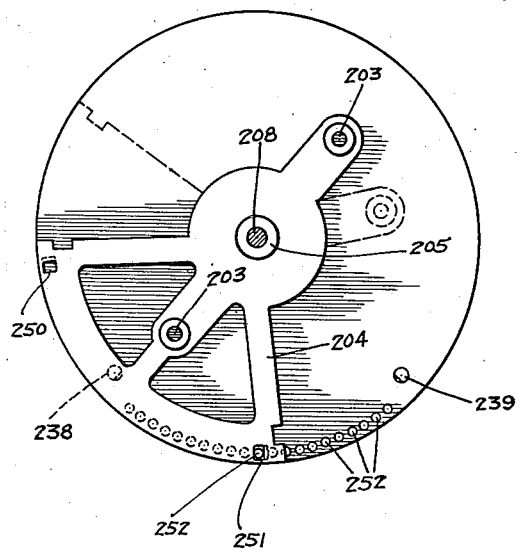
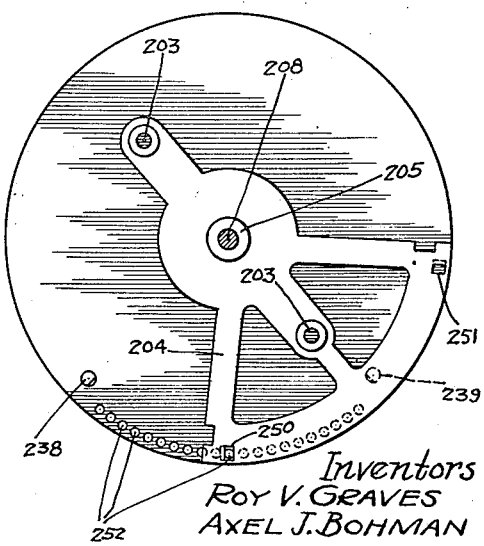
Inventors
ROY V. GRAVES
AXEL J. BOHMAN
ATTORNEYS

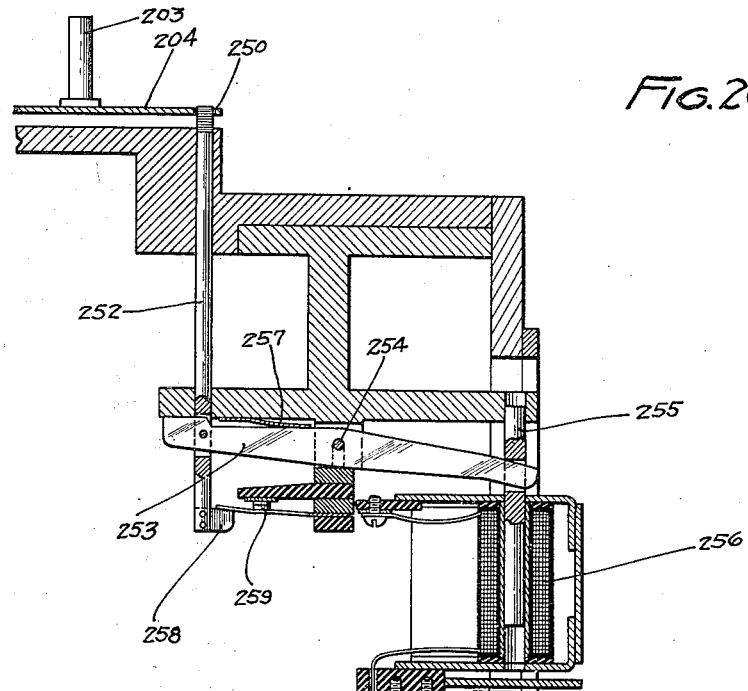
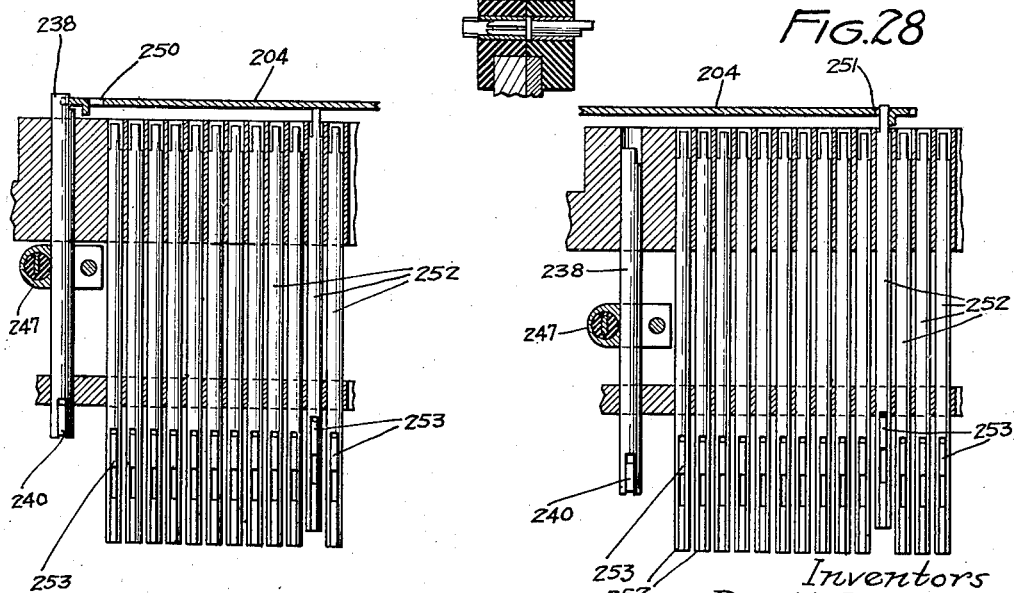

Jan. 18, 1938.    R. V. GRAVES ET AL    2,105,731
COMPOSING MACHINE
Original Filed Jan. 23, 1931    23 Sheets-Sheet 13

Inventors
Roy V. Graves
Axel J. Bohman
By
ATTORNEYS

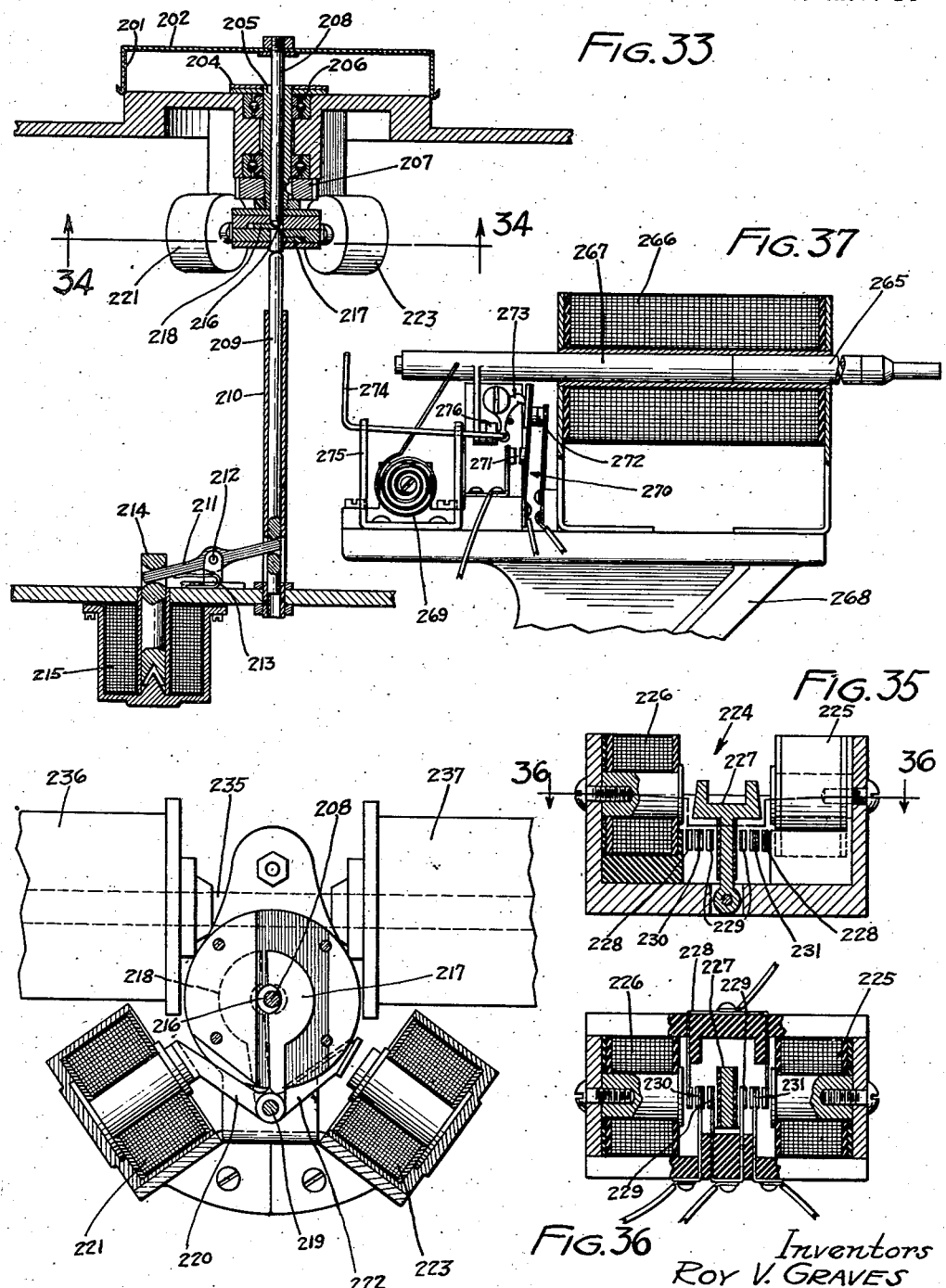

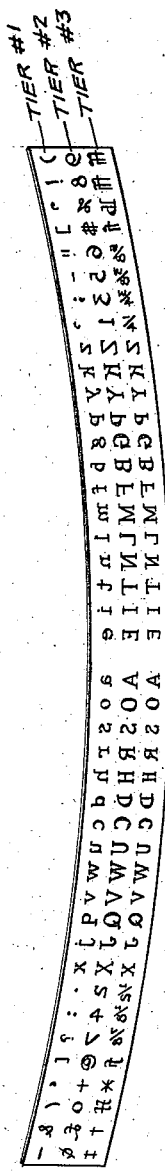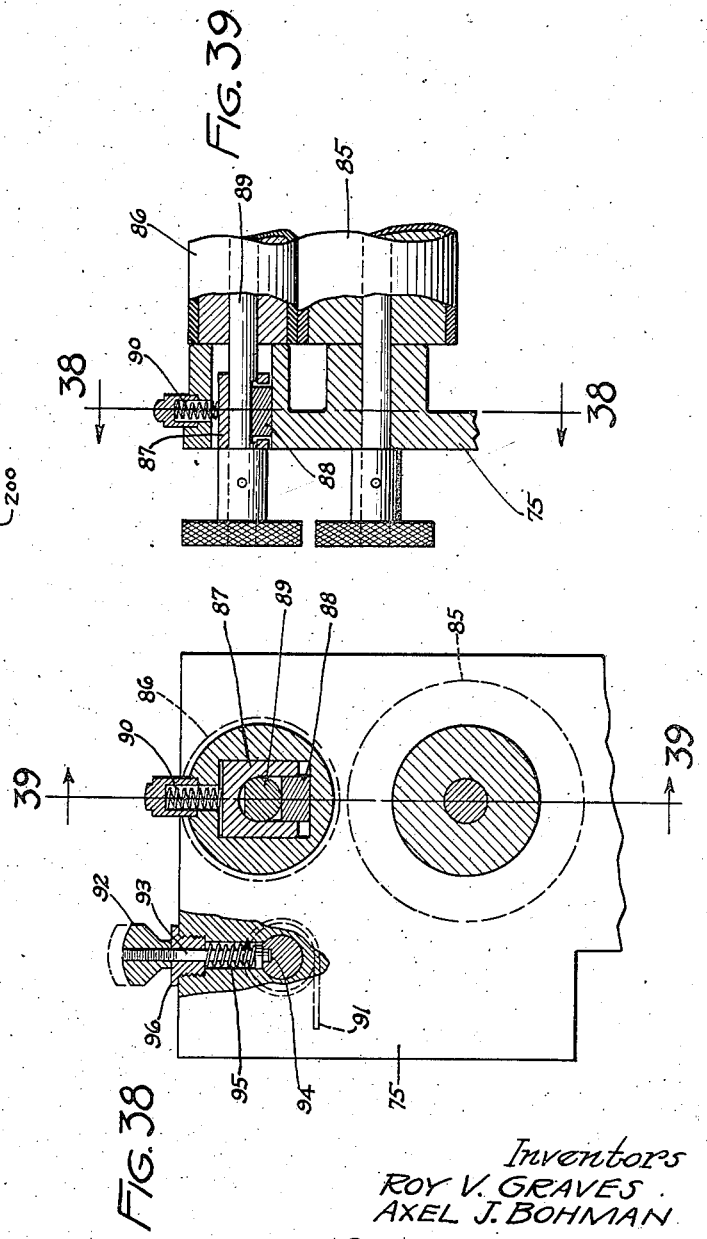

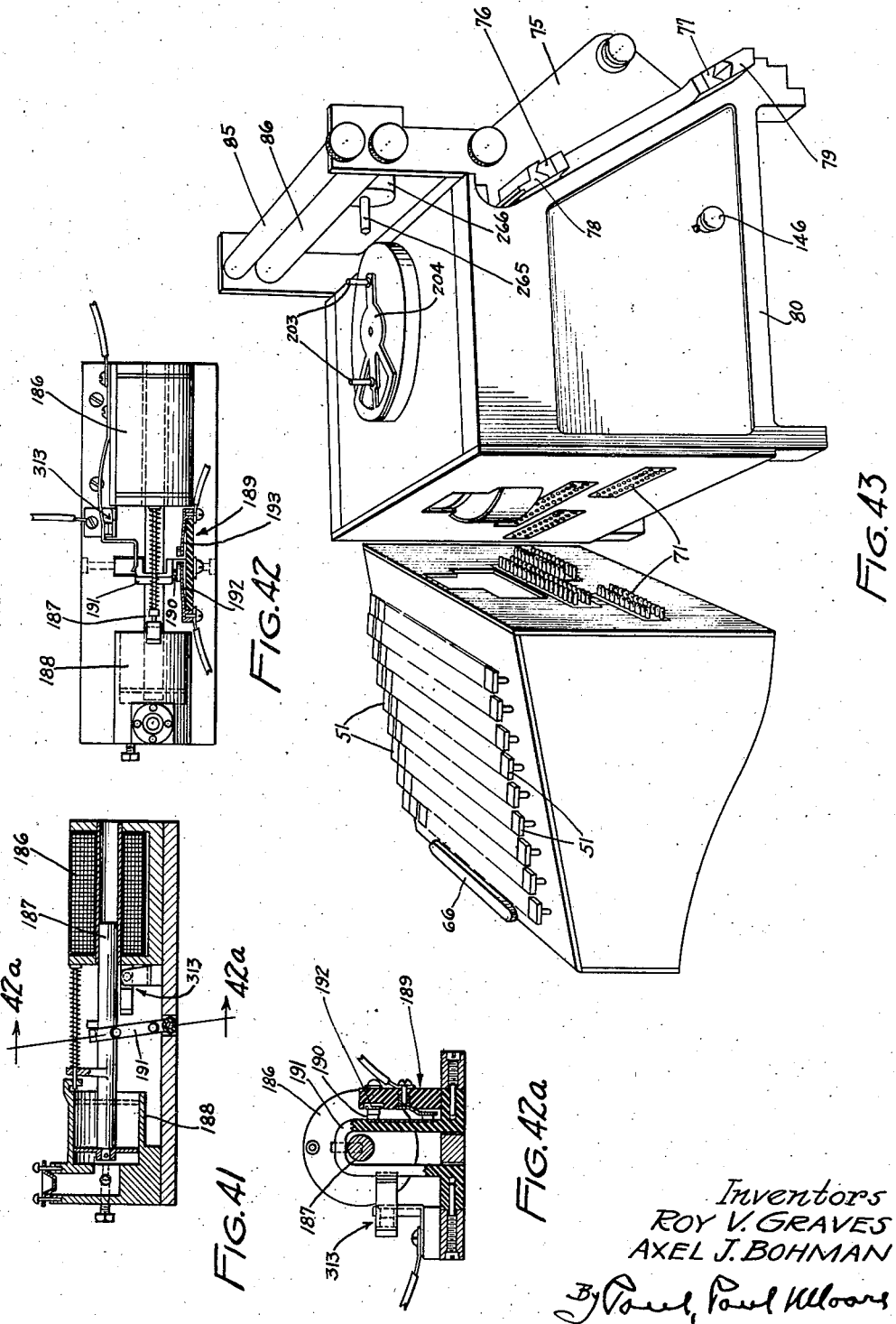

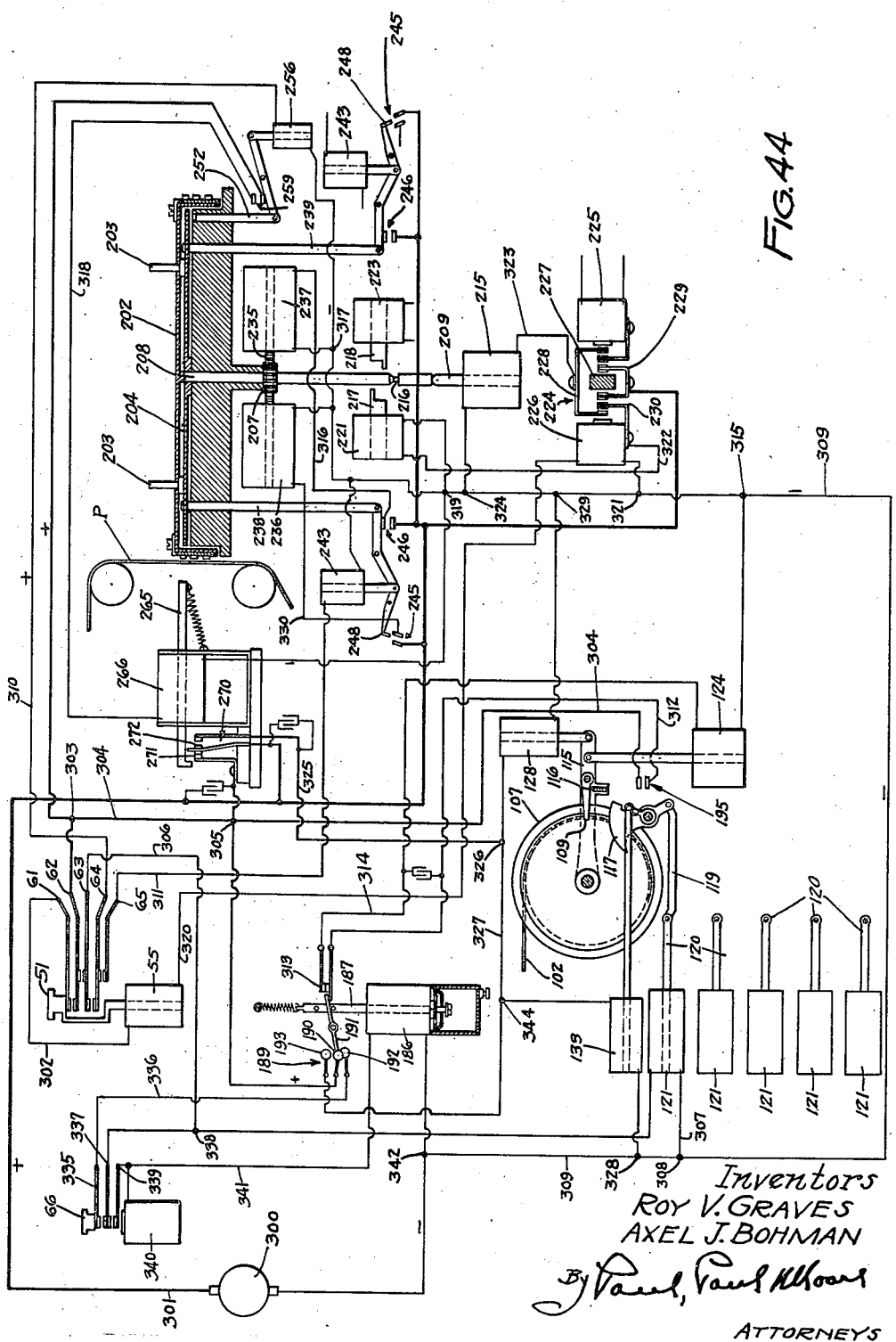

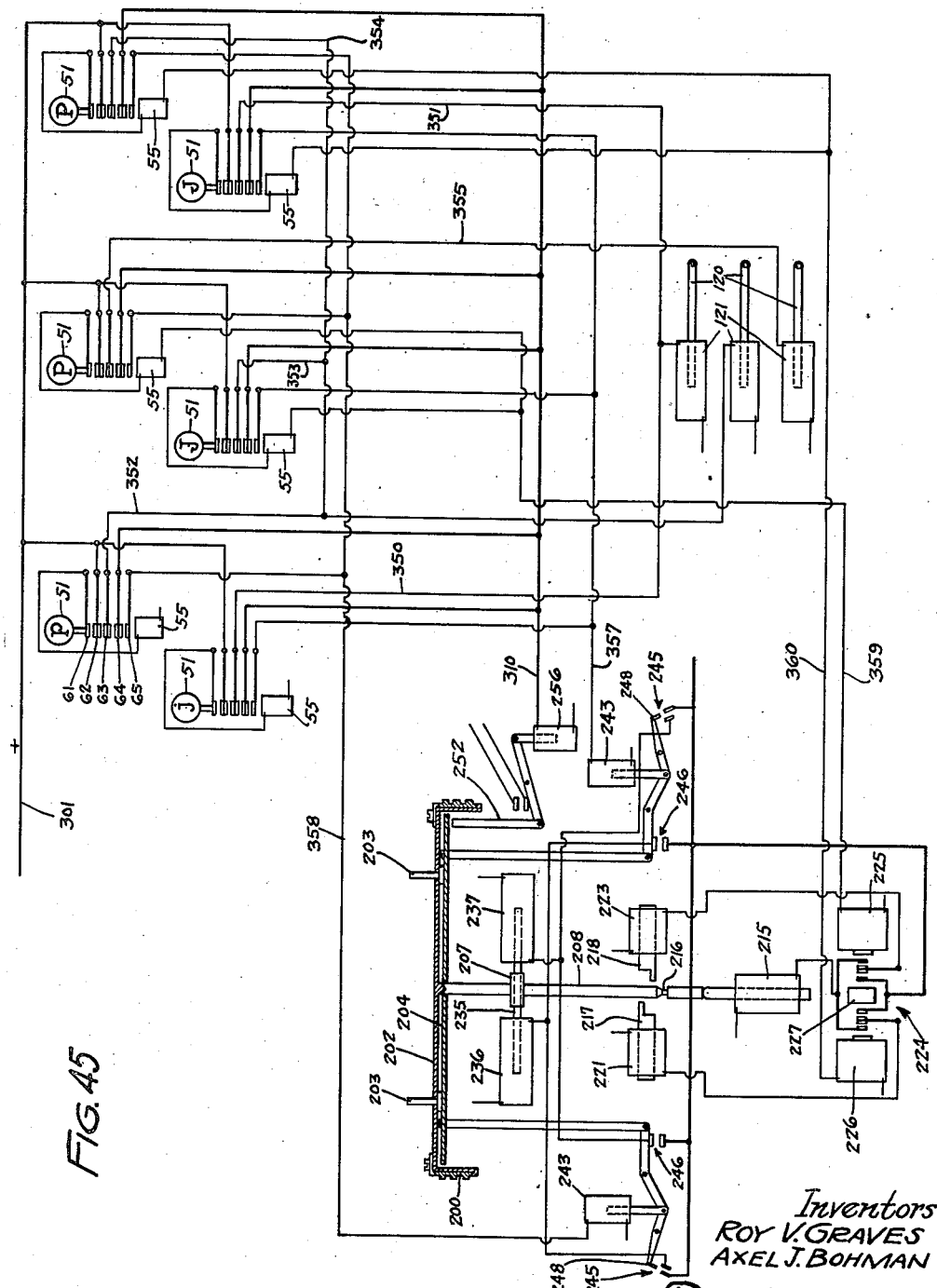

Jan. 18, 1938. R. V. GRAVES ET AL 2,105,731
COMPOSING MACHINE
Original Filed Jan. 23, 1931  23 Sheets-Sheet 19

Inventors
Roy V. Graves
Axel J. Bohman
Attorneys

Jan. 18, 1938.    R. V. GRAVES ET AL    2,105,731
COMPOSING MACHINE
Original Filed Jan. 23, 1931    23 Sheets-Sheet 20
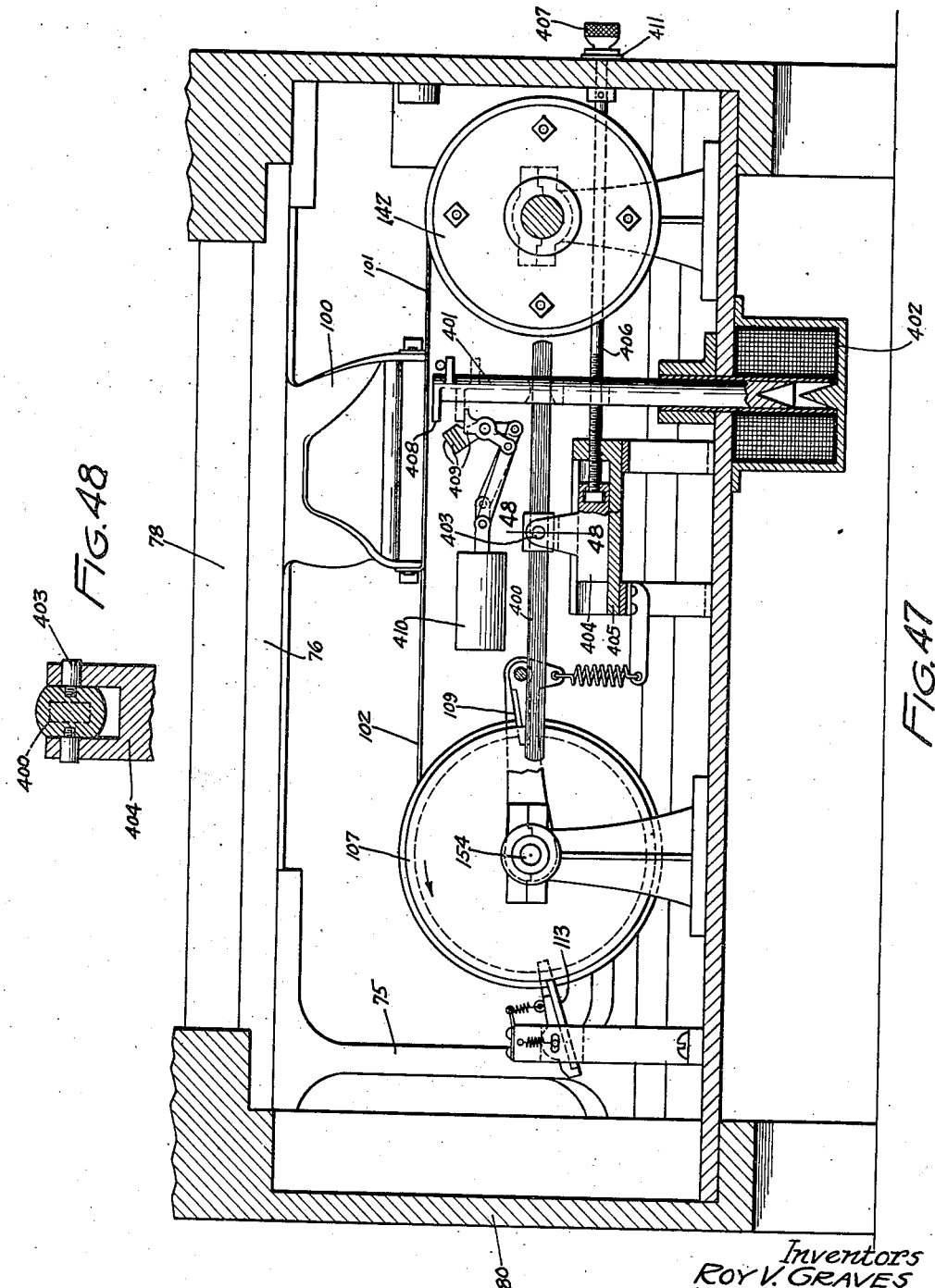
Inventors
ROY V. GRAVES
AXEL J. BOHMAN
By Paul, Paul & Moore
ATTORNEYS Jan. 18, 1938. R. V. GRAVES ET AL 2,105,731
COMPOSING MACHINE
Original Filed Jan. 23, 1931 23 Sheets-Sheet 21
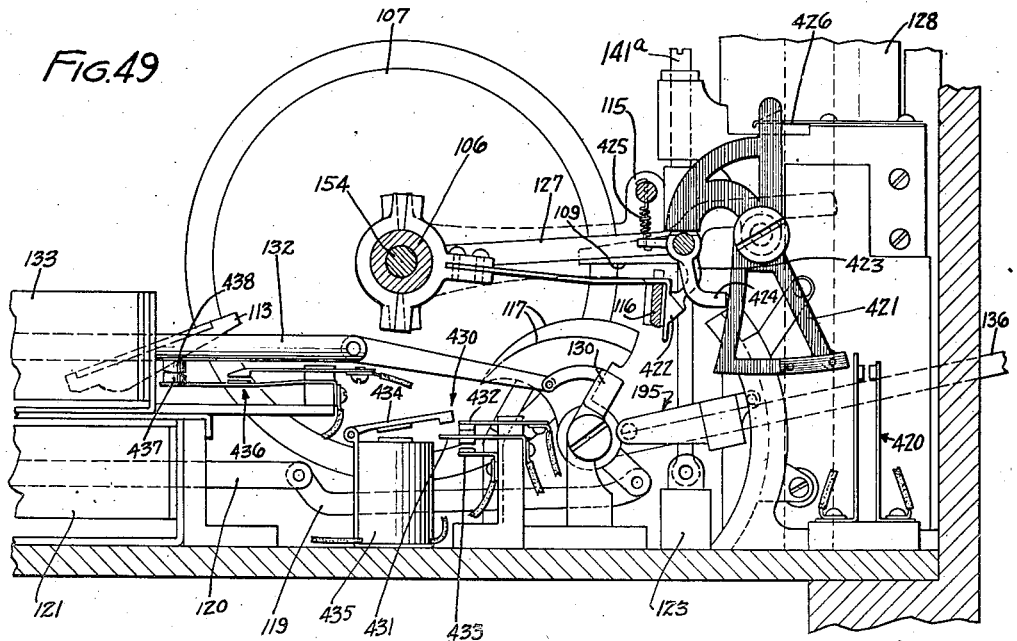
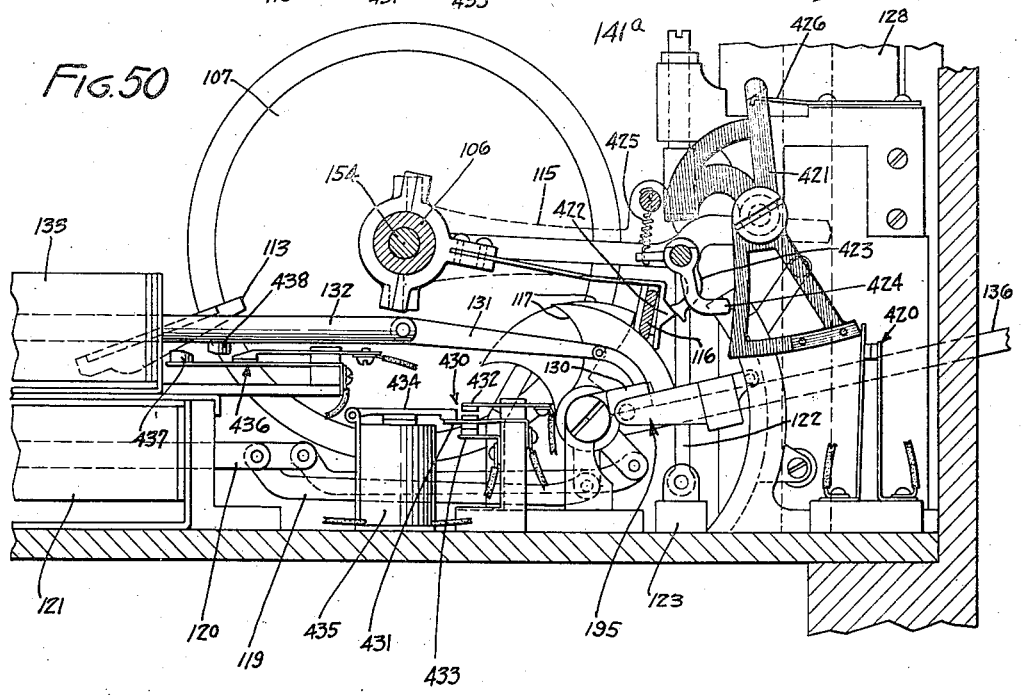
Inventors
ROY V. GRAVES
AXEL J. BOHMAN
ATTORNEYS

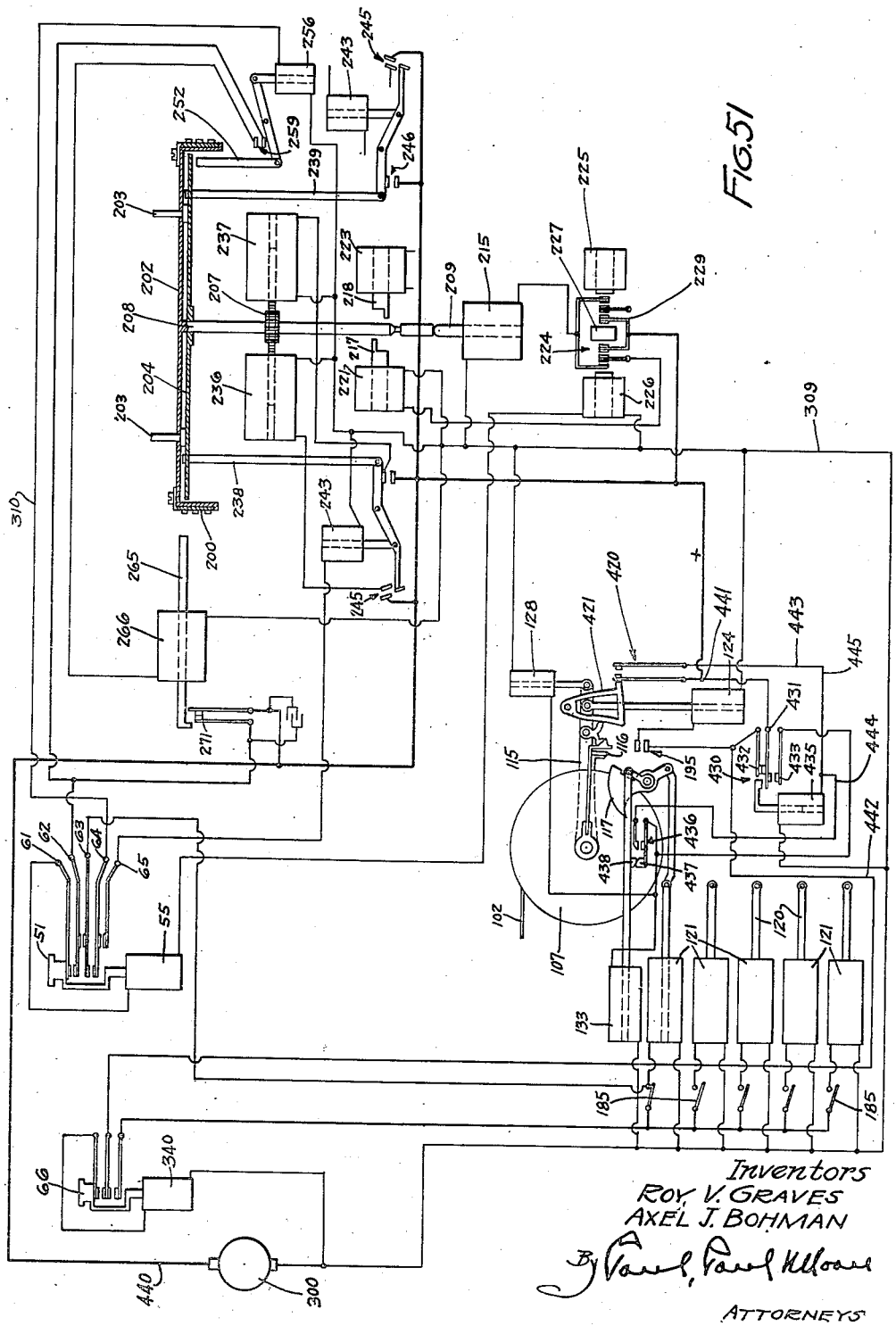

Jan. 18, 1938.    R. V. GRAVES ET AL    2,105,731
COMPOSING MACHINE
Original Filed Jan. 23, 1931    23 Sheets-Sheet 23

Inventors
ROY V. GRAVES
AXEL J. BOHMAN
By Paul, Paul Hoon
ATTORNEYS

Patented Jan. 18, 1938

2,105,731

UNITED STATES PATENT OFFICE 2,105,731

COMPOSING MACHINE

Roy V. Graves and Axel J. Bohman, Minneapolis, Minn., assignors to The Graves Process, Inc., Minneapolis, Minn., a corporation of Delaware Application January 23, 1931, Serial No. 510,644
Renewed December 2, 1937

16 Claims. (Cl. 197—12)

In United States Letters Patent No. 1,733,343 which issued October 29, 1929 to Roy V. Graves, there is disclosed a process of producing printing plates which involves producing the desired composition in opaque characters upon a "master sheet" composed of translucent material, transferring the composition from the master sheet to a metal plate which has been prepared or sensitized, subjecting the metal plate with the master sheet positioned thereon to the action of light, removing from the plate all that portion of the surface which is not covered by the composition, and finally, subjecting the plate to an electrolytic etching process. The plate produced by the foregoing process is then ready for mounting on the particular form necessary for the style of press with which the plate is to be used.

The present invention relates to a machine for producing the master sheet referred to in the above identified patent. That is to say, the machine of the present invention is one which when operated will produce upon a master sheet, a composition made up of accurately justified lines and in which the space for characters or letters is varied in accordance with the size of such characters or letters.

It is an object of our invention to provide a machine of the character described having means for variably spacing the characters or letters comprising a symbol or word.

It is another object of the invention to provide a machine of the character set forth with a carriage for supporting the material upon which the composition is to be produced, the said machine including means for moving said carriage a predetermined variable distance according to the size of the character or letter to be imprinted on the material.

Another object of the invention is to provide a machine of the character set forth wherein the carriage which supports the material to be printed upon is moved to place said material in position before the imprint is made thereon.

Still another object of the invention is to provide a machine having a carriage variably movable in accordance with the size of the characters or letters to be printed with means whereby the variable movement of the carriage may be adjusted in accordance with the set-size of the type employed.

A further object of the invention is to provide a machine of the character set forth having a carriage for supporting the material to be printed upon, a type-wheel bearing the letters or characters to be printed, and a hammer actuatable to strike the material when a selected letter or character has been moved into position for printing, and means connecting the foregoing devices with a key board in such manner that all of said devices are operated substantially simultaneously by the depression of a selected key.

Still another object of the invention is to provide a machine of the character set forth with spacing mechanism for moving the carriage to provide space between words, the said spacing mechanism being variable in accordance with the set-size of the type employed.

A further object of the invention is to provide a machine of the character set forth with a key board which is removable from the machine, in part or as a unit, whereby to provide for interchangeability of type and characters which may be printed by the machine.

Finally, it is an important object of the invention to provide an all automatic, all electric machine for producing printed composition comprising accurately justified lines of print in which the space for the letters or characters comprising a word or symbol is varied in accordance with the size of said characters or letters.

In order that our invention may be clearly understood we have appended hereto drawings showing a present preferred embodiment of our invention. It is to be understood however, that the drawings are submitted by way of example, only, and that we do not limit ourselves to the details of construction therein disclosed. After the principles of our invention have been disclosed, modifications in the construction of the machine will readily suggest themselves to those skilled in the art and such modifications may be made without sacrificing any of the salient features of our invention or departing from the scope thereof as defined in the appended claims.

In these drawings:

Fig. 1 is a vertical longitudinal section view on the line I—I of Fig. 4 showing the relative location of the various units of the machine to wit: keyboard assembly, general frame which houses the variable spacing unit and type wheel and stop mechanism, and the hammer operating unit;

Fig. 2 is a detail sectional view of one of the keys of the keyboard assembly;

Fig. 3 is a plan view of the machine;

Fig. 4 is a rear view of the machine showing the mounting of the carriage on the frame with parts broken away to show the clutch release;

Fig. 5 is a transverse sectional view looking rearwardly of the machine on the line 5—5 of Fig. 9 showing the variable spacing unit and its connecting means with the carriage and also the vernier adjustment for the cam groups;

Fig. 6 is a detail view of the vernier adjusting screw;

Fig. 7 is a detail sectional view on the line 7—7 of Fig. 6;

Fig. 8 is a transverse sectional view looking forwardly of the machine, substantially on the line 8—8 of Fig. 9, showing the carriage return spring drum in section;

Fig. 9 is a plan view of the variable spacing unit;

Fig. 10 is an enlarged detail view on the line 10—10 of Fig. 9 showing the friction drive unit, all parts shown in normal position as also shown in Figure 5;

Fig. 11 is a similar enlarged detail view on the line 11—11 of Fig. 9 showing the parts positioned as those in Figure 8 after having moved the carriage;

Fig. 12 is a detail plan view of the group cams and solenoids for actuating the same. Parts are positioned showing one cam moved to position thus closing switch for carriage feed;

Fig. 13 is a detail sectional view showing switch in open position;

Fig. 14 is a sectional view on the line 14—14 of Fig. 9 showing the carriage operating shaft with friction wheel and clutch drum mounted thereon;

Fig. 15 is a sectional view of the clutch drum on the line 15—15 of Figure 16;

Fig. 16 is a plan sectional view on the line 16—16 of Fig. 15;

Fig. 17 is a detail sectional view on the line 17—17 of Fig. 9 showing the carriage return spring drum and the adjusting means for said spring;

Fig. 18 is an enlarged detail sectional view showing the friction means for feeding the friction wheel;

Fig. 19 is an enlarged detail sectional view showing the friction means provided for preventing any throw back of the friction wheel;

Fig. 20 is a sectional view on the line 20—20 of Fig. 19;

Fig. 21 is a detail sectional view on the line 21—21 of Fig. 4 showing the mechanism for automatically feeding the paper as the carriage reaches the end of a line;

Fig. 22 is a bottom view of the type-wheel stop-mechanism unit;

Fig. 23 is a plan view with parts broken away showing the type-wheel in normal inoperative position.

Fig. 24 is a detail sectional plan view showing position of parts when the type-wheel has been moved in a clockwise direction;

Fig. 25 is a detail sectional plan view showing position of parts after the type-wheel has been moved in a counter-clockwise direction;

Fig. 26 is a vertical sectional view on the line 26—26 of Fig. 23 showing, however, the type-wheel having been moved to the position shown in Fig. 25, wherein the character selector stop-pin has closed the contact to the hammer circuit;

Fig. 27 is a vertical sectional view on the line 27—27 of Fig. 23 showing a character selector stop pin having been moved up against the underside of the lower plate of the type-wheel and showing a lock pin in position preventing the rotation of the type-wheel.

Fig. 28 is a similar view showing the lock pin withdrawn from engagement with the lower plate of the type-wheel and the character selector stop-pin having entered an aperture in the lower plate, these parts being positioned as shown in Fig. 24;

Fig. 33 is a vertical sectional view on the line 33—33 of Fig. 1 showing the lifting end locking means of the type-wheel stem. (The type-wheel is shown raised to the third tier).

Fig. 34 is a sectional view on the line 34—34 of Fig. 33 showing the stem raised to second tier. (Fig. 33 shows the stem raised to the third tier).

Fig. 35 is a longitudinal sectional view of the relay for controlling the tier-lift and stop solenoids;

Fig. 36 is a sectional view on the line 36—36 of Fig. 35;

Fig. 37 is an enlarged detail view of the hammer operating mechanism;

Fig. 38 is a detail sectional view on the line 38—38 of Fig. 39 showing the means for clamping the paper between the upper rolls of the carriage. (Rolls are shown separated).

Fig. 39 is a sectional view on the line 39—39 of Fig. 38. (Rolls are here shown in clamping relation);

Fig. 40 is a view illustrating one font of type on a thin plate which is adapted to be mounted on the type-wheel;

Fig. 41 is a view in section of the timing and switch contacts for the space bar timing unit;

Fig. 42 is a plan view of the mechanism illustrated in Fig. 41;

Fig. 42A is a view partly in elevation and partly in section of the mechanism illustrated in Fig. 41;

Fig. 43 is a view in perspective showing how the keyboard may be removed as a unit from the main body of the machine;

Fig. 44 is a schematic wiring diagram illustrating the hookup of one key with its contacts connected with the various units of the machine. The space bar and its operative relation with the group cam is also illustrated.

Fig. 45 is a schematic wiring diagram illustrating one character-selector stop-pin with its six keys or characters connected therewith and their hookup with the group solenoids and type-wheel relays;

Fig. 47 is a view, partly in elevation and partly in section, of a modified form of control mechanism for governing the carriage movement;

Fig. 48 is a detail in section on line 48—48 of Fig. 47;

Figs. 49 and 50 are views in side elevation, showing a modification of switches operated by the carriage movement mechanism for controlling the electric circuits of the machine;

Figure 32:
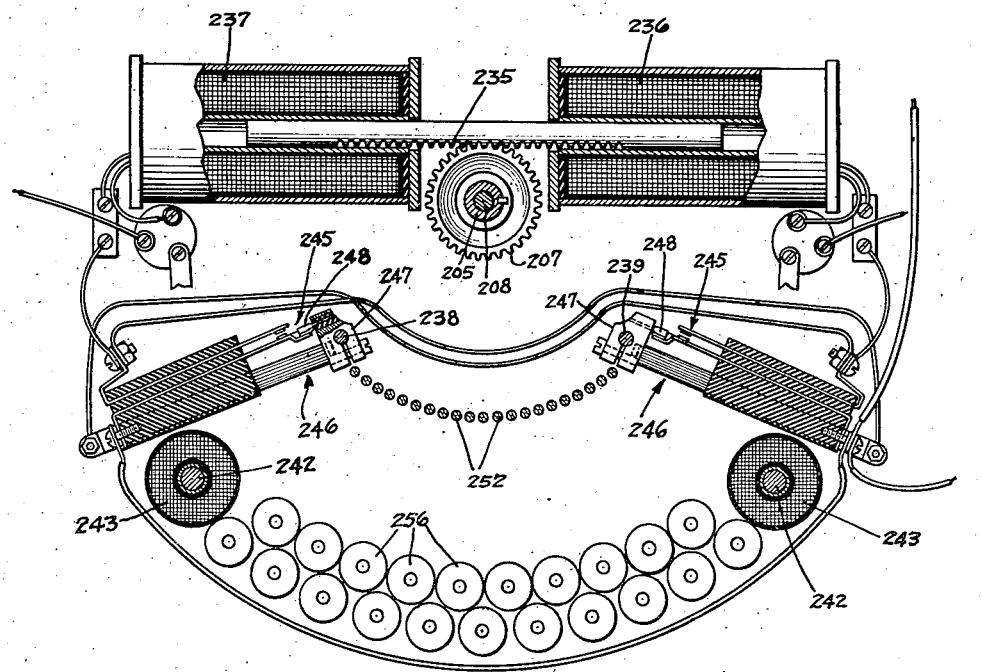
Fig. 32 is a diagrammatic plan view on the line 32—32 of Fig. 29 showing the relative location of the various switch elements for controlling the type-wheel directional magnets.

Fig. 51 is a wiring diagram, similar to Fig. 44, showing a modified circuit and including the switches shown in Figs. 49 and 50; and Figs. 52 to 57, inclusive, are diagrammatic views showing the normal position of the material, the type wheel and the hammer and the successive changes made in the relative position of these parts as the letters of a word are successively brought into printing position.

Our machine comprises, in general, four units, as follows:
1. The key board assembly;
2. Variable spacing or carriage operating mechanism;
3. Character selection mechanism; and
4. Hammer operating mechanism.

It is believed that the invention will best be understood if the several units of the machine be separately described in the order in which they are above given, to which description will be added a disclosure in detail of the electric circuits of the machine and, finally, the operation of the machine will be summarized.

I.—Key board assembly

Referring now to Fig. 1, the key board comprises a casing 50 in which are mounted the character keys and associated mechanisms. In the machine there is a total of 126 keys arranged in three sets of 42 each, one set comprising lower case letters, another set small capitals and the third set, large capitals. Conventional punctuation marks, numerals and other symbols are included so that any desired composition may be produced by actuation of the selected character keys.

The key board is preferably constructed in sections as indicated by lines 50A, Figs. 2 and 3, so that any one or more sections with its corresponding character keys may be removed and others substituted therefore whenever it is desired to change the style of type in which the composition is to be printed, as for example, when the composition is to be printed in a foreign language.

The character keys indicated by the reference numeral 51 are freely and slidably mounted in the casing 50 and are guided in their movement by a guide plate 52 provided with slots through which the stems 53 of the keys freely pass.

Upon the bottom plate 54 of the key board casing, and in alinement with each of the character keys 51, there is mounted an electro-magnet 55 and an associated electric switch mechanism indicated by the general reference numeral 56.

By referring to Fig. 2, it will be seen that the electro-magnet 55 is provided with a core 57 to which is secured a bracket 58 having its other end embedded in a block 59 of insulating material such as fiber or similar composition. The ends of the stems 53 of the character keys contact with the block 59 as clearly shown in Fig. 1.

The switch mechanism 56 includes a block 60 of insulating material secured to the base board 54 and which supports a plurality of electric switch blades. There are five such switch blades and, since each forms part of a different electric circuit, they are designated by different numerals, to-wit: 61, 62, 63, 64, and 65. Each of the blades is provided with a contact point adapted to contact with a similar point on the adjacent blade.

The upper blade 61 is of spring metal and serves to return the character key to its normal elevated position after the electro-magnet 55 has been de-energized, as will hereinafter be more fully described. It is sufficient at present to state that when a character key is depressed, its associated magnet 55 is energized and holds the said character key in its depressed position until the circuit of the magnet is broken by action of the hammer mechanism.

The key board includes also a space bar 66, the electric switch mechanism of which is identical with the similar mechanisms provided for each of the character keys. The space bar is depressed against the action of a spring 67 by which it is returned to its normal elevated position when pressure on the bar is relieved.

In addition to the character keys and the space bar, the key board includes two sets of keys 68 and 69 which are for the purpose of justification. Inasmuch as the justification mechanism forms no part of the invention described in this application, no further reference thereto need be made here.

The key board also includes a carriage reverse key indicated by the reference numeral 70, which, when actuated, will cause the carriage to return to its normal starting position with the paper or other material ready to receive another line of print.

By reference to Fig. 43 it will be seen that the key board assembly may be removed as a unit from the carriage operating mechanism, the character selection mechanism and other parts of the machine. This is made possible by an arrangement of jack switches 71, it being understood that all the electric wires of the key board are connected to the plugs of the said jack switches and all the electric wires of the remainder of the mechanism are connected to the sockets of said switches. The removability of the key board as a unit is a valuable part of our invention in that it enables the service of either part of the machine without affecting the other and it also enables the substitution of a new key board or a new operating mechanism when desired.

II.—Variable spacing or carriage operating mechanism

As has been indicated, an important feature of the present invention resides in the provision of means for moving the carriage a predetermined variable distance in accordance with the character key depressed on the key board. Thus, we have divided the characters into five groups, each group containing all the characters or letters which are of the same width for a given set-size. The letters i, j, f, and punctuation marks, such as the period, comma, and others are included in group 1, this being the group of the shortest base. In group 2 will be included letters a, e, o, u, etc., the numerals 1, 2, 3, 4, etc., and certain marks of punctuation. In groups 3, 4 and 5 are classified the other letters, symbols, or marks of punctuation in accordance with the width of the base of these characters or symbols. Therefore, it is our purpose to cause movement of the carriage a distance equal to the distance for the group to which the character key depressed belongs. Thus, if the character key i be depressed, the carriage will move the shortest distance, that is to say, the distance equal to the width of the characters or letters in group 1. If character key M be depressed, the carriage will be moved the greatest distance, that is to say, the distance equal to the width of the characters or letters constituting group 5.

With the foregoing general statement in mind, it is believed that the following description of the carriage operating mechanism will be readily understood.

The carriage comprises a frame 75 provided with rails 76 and 77 which are slidably supported on rails 78 and 79, suitably secured to the frame 80 of the machine. Anti-friction roller bearings 81 are interposed between the rails to provide for free sliding movement of the carriage.

The carriage frame 75 is provided with spindles 82 for supporting a roll of material indicated by the reference character P which may be translucent paper or other suitable material such as the materials described in the aforesaid patent of Roy V. Graves.

The carriage is also provided with feed rollers 83, 84, 85 and 86 through which the material P is threaded, these rollers being suitably journalled in the frame 75. The feed rollers will be provided with suitable friction coverings, such as rubber, or similar material.

The feed rollers 84 and 86 are so mounted that they may be moved out of contact with the adjacent rollers 83 and 85 to permit ready removal of the material P. The mounting of these rollers is shown in detail in Figs. 38 and 39. In Fig. 38 the upper roller 86 is shown spaced from the roller 85 and in Fig. 39 the rollers are shown in contact. This movement of the rollers 84 and 86 is accomplished through floating spring pressed bearings. As shown in Fig. 38, the bearings comprise a yoke 87 which cooperates with a stationary block 88 to enclose the pintle 89 of the roller. A spring 90 constantly urges the yoke 87 downwardly. When it is desired to move the roller 86 out of contact with the roller 85, the former is rotated through an angle of 180° to bring the round portion of the pintle into engagement with the block 88. By such movement the yoke 87 is elevated to the position shown in Fig. 38, thus causing a corresponding elevation of the roller 86. To return the roller 86 to its normal position in engagement with the roller 85, the former is again turned through an angle of 180° to bring the straight side of the pintle 89 into engagement with the block 88.

The carriage is also provided with a cutter-blade 91 mounted adjacent and to the rear of the roller 86. The cutter-blade 91 is normally maintained out of contact with the material P but may be lowered when it is to be used as a cutter by elevating a knob 92 on a pin 93 which normally seats in a notch 94 in the cutter-blade support. A spring 95 is interposed between the bottom of the pin and a suitable bushing 96 threaded into the frame. This arrangement is such that when the knob 92 is raised, the blade 91 is lowered into contact with the material P and is held in that position through the action of the spring 95 and a flat spiral spring, not shown. The cutter-blade 91 cooperates with a stationary support 97 upon which the material P normally rests.

We will now describe the mechanism for moving the carriage to present the material P in proper position to receive the imprint of the type carried by the type wheel. The carriage is provided with a bracket 100, the ends of which are secured to bands 101 and 102. Movement of the band 102 to the right as viewed in Fig. 4 will cause a corresponding movement of the carriage in the same direction; whereas, movement of the band 101 to the left, as viewed in the said figure will cause the carriage to move a corresponding distance to the left. In general, the band 102 is actuated by the variable spacing mechanism presently to be described and the band 101 constitutes part of the mechanism for restoring the carriage to initial position.

The band 102 is secured to the periphery of a drum 103 journaled in bearings 104. Rotation of the drum will effect winding of the band 102 and will thus draw the carriage to the right as viewed in Fig. 4. The extent of rotation of the drum, and consequently the movement of the carriage, is determined by the variable spacing mechanism now to be described.

By referring to Fig. 14, it will be seen that the drum 103 is secured to a flange 105 forming part of a sleeve 106. A friction wheel 107 is secured to a flange 108 also forming part of the sleeve 106, the arrangement being such that when the friction wheel is rotated it will cause a corresponding rotation of the drum 103.

Rotation of the friction wheel 107 is effected by a friction grab 109 which engages a bead-like portion 110 of the friction wheel, as clearly shown in Fig. 18. The friction grab is pivoted as at 111 and is provided with a spring 112 which tends normally to hold it in elevated position. A similar friction grab 113 engages the bead-like portion of the friction wheel at a point substantially diametrically opposite to the point of engagement of the grab 109. The grab 113 acts as a stop to prevent reverse rotation of the friction wheel and is provided with a spring 114 which tends constantly to maintain the grab in engagement with the wheel.

The grab 109 is mounted upon an arm 115 which is journaled on the bearing of the friction wheel for swinging movement thereon, Fig. 11. The arm 115 is provided with a contact piece 116 which limits the extent of downward movement of the arm. Since the grab 109 is carried by the said arm, it follows that when the arm moves downwardly, the grab will move in a corresponding direction and, by reason of its engagement with the friction wheel, it will cause rotation thereof until the downward movement is stopped when the contact piece 116 engages one of a series of cams which will now be described.

As heretofore indicated, the carriage is designed to be moved a predetermined variable distance depending upon the character key which is depressed on the key board. The letters, numerals and other characters have been divided into five groups in accordance with the width of the letters, characters or numerals constituting the groups. Therefore, we have provided a cam corresponding to each group and the function of which is to control the downward movement of the arm 115 by engagement of the contact piece 116 with the selected cam.

The cams referred to are most clearly shown in Figure 10 and are indicated therein by the reference numeral 117. These cams are mounted for swinging movement about a shaft 118 and each cam is provided with an actuating link 119 secured to the core 120 of a solenoid 121. Thus, there will be a solenoid 121 for each of the cams which, when energized, will cause movement of the link 119 which in turn will cause the corresponding cam to be swung about the shaft 118.

The arm 115 is connected to a yoke 122, the legs of which are secured to the cores 123 of a pair of solenoids 124, Fig. 8. This arrangement is such that when the solenoids are energized, their respective cores will cause a downward movement of the arm 115 thus bringing the contact piece 116 into engagement with the selected one of the cams 117.

Further to assist the downward movement of the arm 115, we have provided an additional solenoid 125, the core 126 of which is slotted to receive an arm 127 forming an extension of the arm 115. The core 126 also forms the core of a solenoid 128 which when energized will cause upward movement of the arm 127 and consequently, upward movement of the arm 115. Thus, the solenoids 124 and 125 co-act to move the arm 115 downward with a corresponding rotation of the friction wheel 107 and the solenoid 128 is operated to restore the foregoing parts to their normal, initial position.

Pivoted on the shaft 118 and movable thereon, we have provided a strap or bracket 130 which is swung about the shaft 118 by movement of any one of the cams 117. The strap 130 is connected to a link 131 secured to the core 132 of a solenoid 133. This arrangement is such that after actuation of the carriage and when the cam 117 is to be returned to its initial position, the solenoid 133 is energized, whereupon the strap 130 will cause movement of the cam 117 back to its initial position.

In order to limit the throw or travel of the cams 117 we have provided a stop 135 secured to a bar 136 pivoted on the shaft 118 and adjustable for a purpose now to be described. It is understood that the extent of travel of the carriage is determined by the downward movement of the arm 115 and limited by contact of the member 116 with a selected cam 117. By adjustment of the bar 136, the stop 135 for the cams may be adjusted so as to vary the travel of the cams. This is best illustrated in Fig. 11. The purpose of this adjustment is to vary the travel of the carriage in accordance with the set-size of the type employed. The bar 136 travels over a graduated sector 137 and is provided at its extremity with a worm 138 which meshes with worm gear teeth provided on the sector, as shown in Figures 5, 6 and 7. Actuation of the worm 138 gives a vernier adjustment for the arm 136. When it is desired to move the arm a relatively great distance on the sector 137, the worm may be moved out of engagement with the teeth on the sector so that the arm 136 may be freely moved. For this purpose, the worm 138 is mounted on a swingable bracket 139 and is held in engagement with the teeth on the sector by a suitable spring 140. A finger piece 141 is provided by manipulation of which the worm may be moved out of engagement with the sector.

The gear teeth on the sector 137 are of such size that movement of the arm 136 the space of one tooth will produce a corresponding change of one one-thousandth of an inch in the travel of the carriage. Thus, if the cams 117 are set to control the travel of the carriage when the set-size of the type is 7, then, by adjustment of the arm 136, the cams may be so adjusted as to control the travel of the carriage when the set-size of the type is changed to 12. Moreover, if a greater travel of the carriage is desired than that which is called for by the set-size of the type, this may be obtained by adjustment of the arm 136 without a corresponding change in the type. For example if type of set-size 5 be employed and it is desired to increase the space between the letters of a word, this may be done by adjusting the arm 136 for the desired distance, for example for a set-size 10. This will enlarge the space between adjacent letters so that a word may be stretched out to cover more space than it normally would for the size of the type employed. Similarly, the space between letters may be decreased by adjusting the arm 136 to a set-size smaller than the set-size of the type employed.

By the foregoing described arrangement, the travel of the carriage may be changed in the same geometric proportion that obtains between the characters of a font of standard printers type. As is well known to those skilled in the printing art, the printers standard sizes of type are based upon the so-called 12-point pica M which is .166" wide and .166" high. The height of all type is designated in points, the basic unit being one point or one-twelfth of .166", or .01383". Consequently, the height or point size of any "M" is the designated point size multiplied by .01383", for example, six point type is six multiplied by .01383" which equals .083".

The width of a type is known as the set. The basis of this standard is again the twelve point pica M. To arrive at a unit, the width, .166", is divided into eighteen equal parts so that a unit of twelve point set is equal to .00922". It follows that the set or width of any character in the font is a predetermined precise number of eighteenths of the "M" in that point, and an exact ratio always exists between the set of any character and the set of the twelve point pica M.

Now then, by manipulation of the arm 136 the movement of the carriage is so altered as to increase the distance traveled thereby upon depression of the character keys in geometric proportion, thus preserving the original relationship between the width of the various characters comprising a font. As will also be understood, the travel of the carriage may be decreased by adjustment of the arm 136 so as to shrink up the line of type, whereby type characters of set-size six and one-half may be printed with the carriage set for movement in accordance with the spacing for characters of set-size six. However, it will not often be necessary or desirable to shrink up the line; the most common need is for expansion.

It may also be desired to vary the travel of the carriage for any given set-size of type by adding to the distance of travel and arithmetic constant. That is to say, it may be desirable, at times, to increase the travel of the carriage for all the characters by a certain number of thousandths of an inch. This may be accomplished in our machine by adjusting the screw 141A (see Figs. 1, 4, 5, 9, 10, 49 and 50). This adjustment of the said screw serves to fix the starting point in the downward travel of the arms or yoke 115. Obviously, the screw may be moved up or down to increase or decrease the movement of the said arms 115, which, as above described, control the amount of rotation of the friction wheel 107. As in connection with the first described variation of the spacing mechanism, it will not often be either necessary or desirable to decrease the travel of the carriage to a distance less than that required by the set-size of the type employed, but if it be desirable to do so, the machine does include the necessary means for attaining this result.

As heretofore indicated, the band 101 is for the purpose of returning the carriage to its starting position after completing a line of print. This band is secured to the periphery of a drum 142 which is provided with a spring 143 against the action of which the drum is rotated. The tension of the spring 143 is adjustable in order to vary the speed with which the carriage is restored to its initial position. This is accomplished through the provision of a gear 144 mounted on the shaft of the drum 142, the said gear being operatively connected to a worm 145 which is manually rotated through a knob 146.

Inasmuch as the friction wheel 107 and the drum 103 are secured to the same shaft, and since the wheel 107 is prevented from rotating in a reverse direction, it is evident that some means must be provided which will permit unwinding of the band 102 when the carriage is restored to its initial or starting position. We have therefore provided the drum 103 with a clutch which, when in engagement, permits the winding of the band 102 on the drum 103 and which when disengaged, permits the unwinding of the said band. This clutch is shown in detail in Figures 14, 15 and 16. By reference to these figures, it will be seen that the periphery of the drum is free to move with respect to the sides of the drum but is held in driving engagement therewith by the clutch mechanism. The clutch comprises a pair of expansible members 150 secured to the sides of the drum and movable into tight driving engagement with the periphery of the drum. Movement of the expansible members is accomplished through a pair of levers 151 each of which is pivotally secured to one of the expansible members by a pin 152. Each lever 151 is, furthermore, connected to one of the expansible members by an adjustable pin 153, arranged as shown in Figure 15. The levers 151 pass through an opening in a clutch pin 154 slidable in the sleeve 106. A spring 155 surrounds the clutch pin and tends normally to urge the pin outwardly of the sleeve and thus to maintain the levers 151 substantially parallel, as will be understood from an inspection of Fig. 14. When the clutch pin 154 is moved inwardly, that is to say to the left as viewed in Figure 14, the levers 151 will swing about their pivot pins 152 thus changing the angle of the axis of the pins 153. The pins 153 act somewhat like a toggle mechanism and are so arranged that when the levers 151 are substantially parallel, they will tightly hold the expansible members 150 in driving engagement with the periphery of the drum at the points 156 and 157. When by actuation of the clutch pin 154 the parallelism of the levers 151 is disturbed, the angle of the axis of the pins 153 is changed thus permitting the periphery of the drum to slip with respect to the expansible members 150.

Automatic means is provided for actuating the clutch to release the same when the carriage is to be restored to its initial or starting position. This means comprises a solenoid 158 which is energized when the carriage reverse key 70 is depressed. The core 159 of the solenoid 158 actuates a lever 160 secured to a rock shaft 161 which is provided with a finger 162 normally engaging the end of the clutch pin 154. The arrangement is such that when the solenoid is energized, the finger 162 will press the clutch pin inwardly in the sleeve 106 against the action of the spring 155. When the clutch is thus released, the carriage will return to its initial position through the rotation of the spring drum 142 which is then free to wind up the band 101.

Mechanism is also provided which is operated by return movement of the carriage to its initial or starting position to move the material P the required distance to receive the next line of print. That is to say, the mechanism functions as a line spacer to move the material P the distance between lines. This mechanism is fully illustrated in Fig. 21. By reference to this figure it will be seen that we have provided a cam support 170 which is slidable in a slideway provided in the top plate of the machine and to one side thereof as shown in Fig. 3. A cam 171 is mounted upon the slide 170 and is vertically adjustable thereon by actuation of an adjusting screw 172, suitably graduated in points corresponding to the distance between lines. The feed rollers 83 and 85 are connected by a link 173 to the central point 174 of which is connected a lever 175 provided at its outer extremity with a cam follower 176 adapted to engage the cam 171. The lever 175 is pivoted at its center, as at 177, to the frame of the machine, this arrangement being such that when the cam follower 176 rides up on the cam 171, the link 173 will be moved downwardly with a corresponding counterclockwise rotation of the feed rollers 83 and 85. As will be seen from an inspection of said Fig. 21, the link 173 is connected by dogs 173A to friction rings 174B on said rollers 83 and 85. When the link 173 returns to normal or initial position, reverse movement of the rollers 83 and 85 is prevented by the brake pawls 178A on the link 178. This movement of the feed rollers brings the material P into position to receive the next line of print.

The cam follower 176 is normally held in lowered position through the action of a spring 179 by which it is held in engagement with a suitable stop pin 180. It will be understood, of course, that the line spacing may be varied by vertically adjusting the cam 171 to provide whatever space may be desired between successive lines, as above described.

As has heretofore been indicated, the space bar 66 when operated will provide the required space between words in a line. This space may be made as wide as desired by connecting the circuits from the space bar to any one of the solenoids 121 of which we have provided one for each group. Thus, if the space between words is to be equal to the width of a narrow letter such as the letter "i", the electric circuit from the space bar will be connected to the solenoid for group No. 1. If a wider space is desired, the circuits may be connected to any other one of the solenoids 121. This connection is effected by manual switches 185, shown in Fig. 46. In practice the space bar will be connected to the solenoid for group No. 1, and the space will be automatically changed with changes in the set-size of the type.

Depression of the space bar 66 also energizes a solenoid 186 which acts as a timing mechanism for the space bar movement. By reference to Figs. 41, 42 and 42A, it will be seen that the core 187 of the solenoid 186 works in a vacuum dashpot 188 by which the speed of movement of the core may be controlled. The core of this solenoid operates a switch 189 in the following manner:

A contact 190 on a yoke 191 operated by movement of the core 187, is normally in contact with a switch blade 192, as shown in Fig. 42. When the space bar is depressed, the core 187 is moved to the right, as viewed in said figure, thus moving the contact 190 into engagement with a switch blade 193 and out of engagement with the blade 192. At the same time, the yoke 191 opens a normally closed switch 313, the function of which will be fully described in connection with the wiring diagrams shown in Figs. 44 and 46. The effect upon the various circuits of the operation of the switch 189, as here described will also be understood when the said wiring diagrams are described.

By inspection of Fig. 12, it will be seen that the adjustable arm 136 carries an electric switch 195, the blades of which contact with continuous contact strips 196 suitably supported on an insulating block 197. The switch 195 is normally open and is closed by the strap 130 whenever a selected one of the cams 117 is moved into position to control the carriage movement. The switch 195, as will be more fully pointed out in the wiring diagrams hereinafter described, functions to close the power circuits from the character keys on the keyboard through the hammer circuit to the solenoids 124 and 125 which move the arm 115 downwardly to bring the contact piece 116 into engagement with the selected cam 117.

III—Character selection mechanism

The type which makes the imprint upon the material P is arranged on a type-band 200 removably supported on an anvil 201 connected to a spider 202, this structure comprising what will hereinafter be termed the type-wheel. It will be understood that the type-band and anvil may be made as one integral structure rather than as two separate parts secured together. The type wheel is removably supported upon pins 203 projecting upwardly from a lock plate 204. The lock plate 204 is keyed to a bushing 205 which is rotatable in an anti-friction bearing 206. At its lower end, the bushing 205 is provided with a pinion 207 by rotation of which the bushing, and consequently also the lock plate, are rotated. The spider 202 is provided with a spindle 208 which passes freely through the bushing 205 and which at its lower end rests freely on a lift pin 209 slidable in a sleeve 210.

As will be noted from an inspection of Figure 40 in which is illustrated one form of type-band which may be employed with our machine, the band is provided with three rows or tiers of type characters. The upper row, or tier No. 1, contains the lower case letters and certain marks of punctuation; the middle row, or tier No. 2, contains the large capitals, numerals and certain other marks of punctuation; the lower row, or tier No. 3, contains the small capitals and certain other characters and signs. The type-band is so supported on the wheel that the lower case letters comprising tier No. 1 are normally in position, so far as elevation is concerned, for printing upon the material P. Whenever it is desired to shift from lower case to either small or large capitals, it is of course necessary to move the type-wheel vertically to bring the desired tier into proper position with respect to the material P. This vertical movement of the type-wheel is effected by the tier-shift mechanism now to be described.

The lift pin 209 is at its lower end connected to one end of a lever 211, Fig. 23, which is fulcrumed at 212 and which is normally maintained in substantially horizontal, or inoperative position, by the action of a spring 213. The other end of the lever 211 is connected to the core 214 of a solenoid 215 suitably supported on the floor plate of the machine.

The spindle 208 is provided with a circumferential notch 216 into which a selected locking member is adapted to enter whereby to limit the upward movement of the spindle. Two such locking members are provided and they are shown in detail in Figure 34 wherein these members are designated by the reference numerals 217 and 218. The locking member 217 is pivoted as at 219 and is provided with an actuating portion 220 adapted to be attracted by an electromagnet 221. The locking member 218 has a similar actuating portion 222 which is adapted to be attracted by an electromagnet 223. The circuits for the magnets 221 and 223 are closed by the actuation of a relay indicated by the general reference numeral 224. The relay comprises a pair of electromagnets 225 and 226 and an armature 227 adapted to be attracted to the cores of said magnets when either of them is energized. The circuits for the magnets 225 and 226 are connected to the character keys on the keyboard and are closed when a selected character key is depressed.

It is to be remembered that the tier-shifting mechanism is operated when it is desired to move either tier No. 2 or tier No. 3 of the type-band 200 into position for printing on the material P. Hence, all the keys of the keyboard which correspond to characters in tier No. 2 of the type-band will close a circuit to one of the magnets of the relay 224, for example, the magnet 225. All of the keys of the keyboard which correspond to letters or characters in the third tier of the type-band will close circuits for the other of the magnets of the relay 224, that is to say the magnet 226.

The relay 224 operates to close the switches which control the electric circuits for the lift magnet 215 and the locking magnets 221 and 223. These switches are shown in Figures 35 and 36 in which figures the reference numeral 228 indicates a fixed contact for the magnet 215 and the numeral 229 indicates a pair of contacts connected to the main power circuit. The intermediate contacts 230 and 231 are connected to the circuits of the magnets 221 and 223, respectively. Assuming that the magnet 225 is energized, the operation of the relay is as follows:

The armature 227 moves to the right, as viewed in Figs. 35 and 36, thereby closing the circuit from the power line contact 229 to the lift magnet contact 228 and to the lock magnet contact 231. These circuits being completed, the lift magnet will be energized to cause upward movement of the lift pin 209 which effects a corresponding movement of the spindle 208. Simultaneously, the magnet 223 is energized to draw the lock member 218 into engagement with the notch 216 in the spindle. This will produce an upward movement of the type-wheel a distance sufficient to present tier No. 2 of the type-band in position for printing on the material and it will be held in that position so long as the lock member 218 remains in the notch 216.

Referring again to Fig. 40, it will be noted that the characters or letters comprising a tier on the type-band 200 are arranged in two rows, one at each side of the center of the type-band, and therefore, the selected character must be brought into a central position to make its imprint upon the material P. To accomplish this, the type-wheel is rotated in a horizontal plane to bring the selected character into the necessary position. The mechanism for thus rotating the type-wheel will now be described.

By reference to Figure 32, it will be seen that the pinion 207 which is keyed to the bushing 205 meshes with a rack 235 which constitutes the core of a pair of solenoids 236 and 237. When either of these solenoids is energized, the core will be moved, thus rotating the pinion 207 which therefore will cause rotation of the lock plate 204. Since the type-wheel is connected to the lock plate by means of the pins 203, it follows that the type-wheel will be rotated with the plate.

Referring now to Figure 23, it will be seen that the lock plate 204 is maintained in its normal, inoperative position by means of a pair of pins 238 and 239 which engage in notches or recesses formed in the edges of the lock plate. When either the pin 238 or the pin 239 is withdrawn from engagement with the lock plate, the plate is free to rotate and passes over the pin which has thus been withdrawn. These pins therefore determine the direction in which the lock plate may be moved and they may therefore be referred to as direction lock pins.

Figure 29:
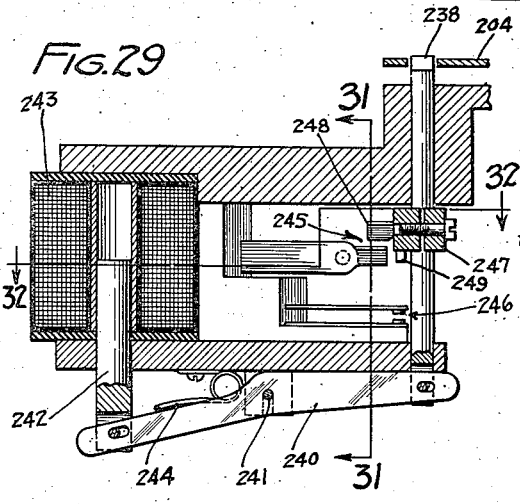
Fig. 29 is a detail sectional view on the line 29—29 of Fig. 23 showing the type-wheel lock pin in locking position.
Figure 30:
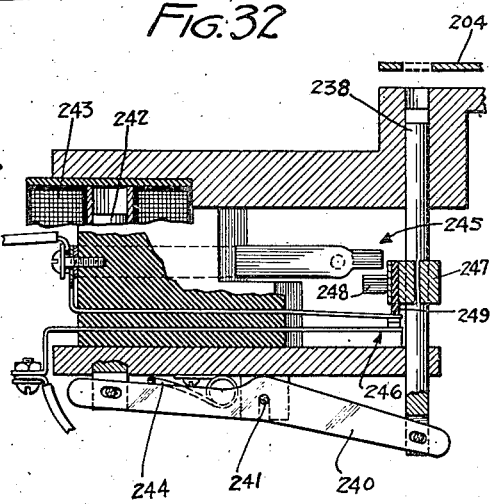
Fig. 30 is a similar view showing the lock pin withdrawn from engagement with the type-wheel, parts being broken away to show various switch contacts.
Figure 31:
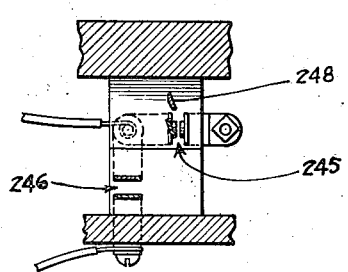
Fig. 31 is a detail sectional view on the line 31—31 of Fig. 29.

The mechanism for withdrawing the lock pins from engagement with the plate is shown in detail in Figures 29 and 30. Each of the pins is connected to one end of a lever 240 pivoted at 241 and the other end of the lever is connected to the core 242 of a solenoid 243. A suitable spring 244 is positioned on the side of the pivot point opposite to that on which the lever joins the lock pin and tends constantly to maintain the lock pin in its upper, operative position. When the solenoid 243 is energized, the core 242 will be drawn into the coil thus pivoting the lever 240 and withdrawing the lock pin from engagement with the lock plate. The solenoid 243 is energized when the circuit therefor is closed by depression of a selected key on the keyboard as will be more fully described in connection with the wiring diagrams.

Two switches are operated by movement of the direction lock pin for closing and opening the circuits of the directional solenoids 236 and 237. These switches are designated by the reference numerals 245 and 246. A switch actuating member 247 is secured to the lock pins and is movable therewith. The member 247 is provided with actuating points 248 and 249 for actuating the switches herein referred to. In Figure 29, the lock pin 238 is shown in its upper operative position. If now the solenoid 243 is energized, the lock pin will be moved downwardly as heretofore described. During such downward movement, the actuating point 248 enters in between the points of the switch 245 and separates them a distance greater than their normal distance of separation. Upon continued descent of the lock pin, the point 249 engages and closes the switch 246 which thereupon closes the circuit to the selected directional solenoid, in this instance, the solenoid 237. When the solenoid 243 is de-energized, the directional lock pin 238 is moved to its upper operative position through the influence of the spring 244. Thereupon the switch 246 is opened. During the upward movement of the lock pin, the contact point 248 engages and closes the switch 245 which, therefore, completes the circuit to the other of the directional solenoids, in this case the solenoid 236 which, being energized, will restore the type shuttle to its normal, inoperative position. Whereupon direction lock pin 238 resumes its locking position and opens switch 245.

The foregoing description has been directed to the mechanism for rotating the type-wheel in the desired direction and there now remains to be described the mechanism for locking the wheel in position to permit the printing of a selected character on the type-band.

The lock plate 204 is provided near its outer edge with openings 250 and 251 which are adapted to receive the end of a selected one of a plurality of stop pins 252, Figure 23. As heretofore indicated, there are 42 letters, characters or symbols in each tier on the type-band, these being arranged in rows of 21 each, on each side of the center of the type-band. Thus, if a character or letter to the left of the center of the type-band, as viewed in Figure 23, is to be brought into position for printing, the type-wheel will be rotated to the right the required distance to bring the selected type into printing position. Similarly, if the selected character is on the right of the center of the type-band as viewed in said figure, the wheel will be rotated to the left the required distance in order to bring the selected letter into position for printing.

Therefore, it is evident that only 21 stop pins will be required in order to stop the type-wheel in any selected position. This is illustrated more clearly in Figures 24 and 25. For example, the letter "Y" is the eleventh letter in all the tiers of type to the left of the center of the type-band and the letter "Q" is the eleventh letter of each tie to the right of the center of the type-band. Hence, they will have a common stop pin 252 which, in the instance given, will be the center stop pin of the group. In Figure 24, the lock plate 204 is shown after rotation to the right to bring the letter "Y" into position for printing and it is seen that the center stop pin is engaged in the opening 251 in the lock plate. In Figure 25, the type-wheel has been rotated to the left to bring the letter Q into position for printing and it is seen that in this position the center stop pin is engaged in the opening 250 in the lock plate 204. Other examples might be given but it is believed that the foregoing is sufficient to make clear the operation of the stop pins to hold the type-wheel in position for printing a selected character or letter. Thus, each stop pin is effective to control the rotation of the type-wheel in both directions and, since there are three tiers of characters or letters, it will be evident that each stop pin is operable to control movement of the type-wheel for six characters or letters on the type-band. This will be more fully brought out in connection with the wiring diagram disclosed in Figure 45 and which will presently be described.

The stop pins 252, Figs. 26 to 28, are operated through circuits which are closed by depression of a selected character key on the keyboard. Each of the stop pins is secured to one end of a lever 253 pivoted at 254 and having its other end engaged in an aperture formed in the core 255 of a solenoid 256. A spring 257 engages the lever 253 and tends constantly to maintain the stop pin in its lower inoperative position. When the solenoid 256 is energized, the core 255 will move downwardly thus pivoting the lever 253 about its pivot and causing upward movement of the stop pin 252. While this action is taking place, the lock plate 204 is being rotated and when either of the openings 250 or 251 comes into alinement with the actuated stop pin, the latter will enter into said opening, thus completing its upward movement.

Each of the stop pins is provided at its lower end with an actuating member 258 for closing a switch 259, as clearly shown in Fig. 26. It will be understood that the switch 259 is normally open and is closed only when the stop pin 252 has reached the upper limit of its movement into operative position and only after stop pin has entered hole 250 or 251. The switch 259 closes a circuit leading to the hammer actuating solenoid which will presently be described.

IV—Hammer operating mechanism

When the material P has been positioned to receive the imprint of a selected letter or character from the type-wheel a hammer moves rapidly forward and strikes the material thus bringing it into contact with the selected character or letter. The hammer and the mechanism for operating the same are illustrated in Figures 1 and 37.

The hammer proper, designated by reference numeral 265 is slidable in a solenoid 266 and is projected therefrom by actuation of the core 267 of the said solenoid. As clearly shown in Figure 1, the hammer mechanism is mounted upon a stationary bracket 268 secured to the rear of the machine. The striking surface of the hammer is preferably formed of fibre or other resilient composition. A spring 269 is connected to the hammer and serves to maintain it normally in retracted position. When the solenoid 266 is energized, the hammer is projected against the action of the said spring.

As has heretofore been indicated, the main power circuit of the keyboard and, hence, of the parts of the machine controlled by the keys, goes through the hammer mechanism and, therefore, the hammer mechanism serves properly to time the operation of these parts of the machine. This is accomplished through the actuation by the hammer of a switch designated by the general reference numeral 270. In Figure 1, in which the hammer is shown in its retracted, inoperative position, the contacts 271 of the switch 270 are closed, while the contacts 272 are open; whereas in Figure 37, in which the hammer is shown in its projected operative position, the contacts 271 are open and the contacts 272 closed. As will be more clearly pointed out when the wiring diagrams are hereafter described, the breaking of the contacts 271 breaks the main circuit for the keyboard which results in the restoration of all parts controlled by the keys to their normal inoperative position through the closing of the circuits controlled by the contacts 272. Closing the contacts 272 makes the secondary circuit to the solenoids 128 and 133 which return the carriage to initial position.

The mechanism for operating the switch 270 comprises a pivoted switch actuating member 273 which is connected to a rod 274 secured in a bracket 275 mounted upon the support for the hammer mechanism. The hammer carries a striker 276 which, as the hammer moves forward, engages the switch actuating member 273 thus pivoting the same and bringing its effective point into contact with the center blade of the switch 270. This operation breaks the contact at 271 and established contact at 272. The hammer returns through the action of the spring 269, thus breaking the contact at 272 and re-establishing contact at 271. This interval constitutes the time element for the operation of the machine and its return to initial, inoperative position, ready for the next operation.

V—Electric circuits and operation

Figure 46:
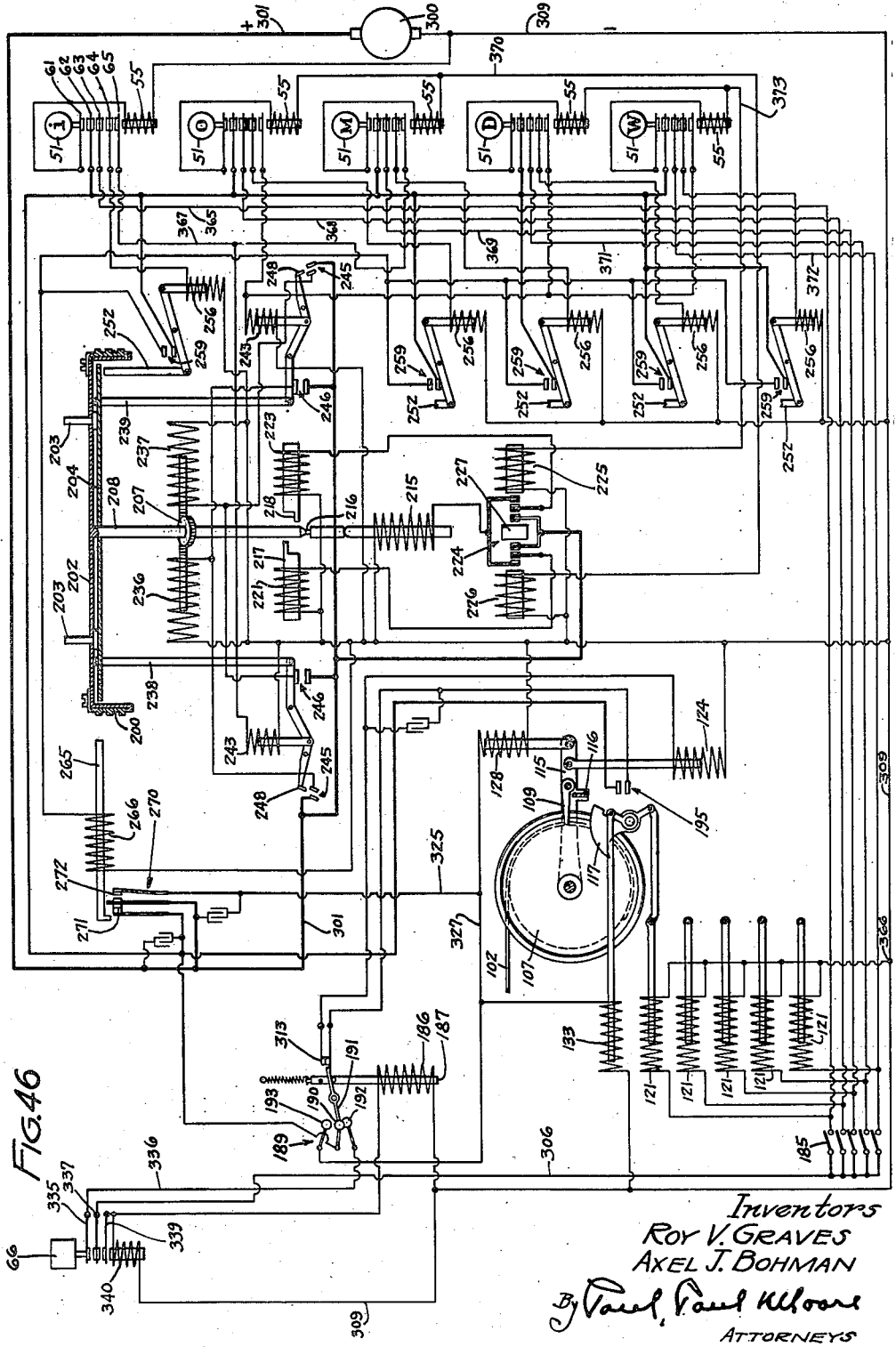
Fig. 46 is a general wiring diagram, partly schematic, showing the hookup of five keys and the space bar, which illustrates the operation of all of the various units of the machine and the sequences of operation.

In Figures 44, 45 and 46 we have shown diagrammatically the circuits which control the operation of the several parts of the machine. While it is thought a clear idea of the operation of the machine may be had from the foregoing description, it seems desirable to review the operation and this may best be done when the electric circuits shown in the wiring diagrams are described.

Figure 44 shows the complete circuit for one of the character keys on the keyboard and for the space bar. In this figure, a character key 5 has been selected, the type of which is located in the third tier on the type band.

As in Figure 1, the reference numeral 51 indicates the character key and the reference numeral 55 indicates the hold-down magnet. The five switch blades are indicated by the reference numerals 61, 62, 63, 64 and 65. The reference numeral 300 indicates any convenient source of power for the machine such as a generator, battery or any other similar device. The incoming power line 301 passes from the source of power to the center blade of the switch 270, also to the switch 245, thence to the switch 246, and to the contacts 229 of the relay 224.

The hold-down magnet 55 is connected to the switch blade 61 by a line 302. The blade 62 is connected at terminal 303 to a line 304 which at the terminal 305 connects with the power circuit through the switch 270. Thus when the character key 51 is depressed to bring the contact of the switch blade 61 into engagement with the contact of the switch blade 62, the hold-down magnet 55 will be energized and will thus hold the character key in its depressed position until the circuit of the hold-down magnet is broken. In this manner, the character key is operatively connected to the main power circuit of the machine.

The switch blade 63 is connected by a line 306 to one of the solenoids 121, which actuates a selected one of the cams 117. This circuit is completed through the windings of the solenoid and out through the line 307 to terminal 308 on the negative or return line 309.

The switch blade 64 is connected by a line 310 to the magnetic coil 256 which actuates the associated stop pin 252. This circuit is completed through the windings of the coil 256 and out to the negative or return line 309.

The switch blade 65 is connected by a line 311 to the magnetic coil 243 which operates the associated directional lock pin 238. This circuit is completed through the windings of the coil and out to the return line 309.

With the circuits arranged to the manner described, the operation of the machine is as follows: The character key being depressed closes the main power circuit and energizes the hold-down magnet 55 which therefore will close all the other circuits emanating from the character key. Thereupon the solenoid 121 is energized to move the selected cam 117 into position which closes the switch 195, one terminal of which is connected to the power line 304. The other terminal of said switch is connected through the line 312 to a normally closed switch 313 associated with the space bar mechanism and operated in a manner hereinafter described. The circuit is through the switch 313 and outwardly through the line 314 to the solenoid 124, through the windings of said solenoid and out to the return line 309 at the terminal 315. Thus the solenoid 124 is energized to move the arm 115 downward and this movement continues until the contact piece engages the cam 117. This movement has been effective to cause rotation of the friction wheel 107 by movement of the friction grab 109. Thus, the carriage is moved the distance called for by the character key depressed on the keyboard.

Simultaneously, the circuit is closed through the line 310 to the electro magnet 256 which actuates the stop pin 252. However the stop pin cannot reach its operative position until one of the apertures 250 or 251, in the lock plate 204 comes into alignment with the pin. The circuit for rotating the lock plate and hence, also, the type wheel is traced from the switch blade 65 through the line 311 to the electro magnet 243 which, being energized closes the switch 246. A circuit is then established from the switch 246 through the line 316 to the directional magnet 237, through the windings of said magnet to terminal 317 on the return line 309. The magnet 237 being energized draws the rack 235 to the right as viewed in Figure 44 thus rotating the pinion 207 and therefore causing rotation of the lock plate as well as the type wheel. It is understood, of course, that when the magnet 243 was energized to close the switch 246, the directional lock pin was simultaneously removed from engagement with the lock plate 204.

The upward movement of the stop pin 252 into operative position closes the switch 259 and establishes a circuit from the power line through the switch and through the line 318 to the solenoid 266 of the hammer. This circuit is completed through the windings of the solenoid 266 and out to the terminal 319 on the return line 309. The solenoid of the hammer being energized projects the hammer forwardly so that it strikes the material P thus producing thereon the impression of the type face which has been moved into alignment by movement of the type wheel.

The character key selected for illustration in the wiring diagram now being described corresponds to a letter in the third tier on the type band and hence, the type wheel must be elevated in order to present this character in position to cause the imprint on the material. The circuit for effecting this tier shift is traced from the hold-down magnet 55 through the line 320 to the magnetic coil 226 of the relay 224. This circuit is completed through the windings of the coil 226 and out to the terminal 321 on the return line 309. The coil 226 being energized attracts the armature 227 which thereupon closes the circuits from the power line contacts 229 to the contacts 228 and 230. The circuit from the contact 230 is traced through the line 322 to the magnetic coil 221 which moves the latch 217 into engagement with the notch 216 in the spindle 208.

The circuit from the contact 228 is traced through the line 323 to the lift magnet 215, through the windings of said magnet and out to the terminal 324 on the return line 309. When the magnet 215 is energized it projects the lift pin 209 upwardly thus causing a corresponding elevation of the spindle 208 until the latch 217 engages in the notch 216.

When by closing of the foregoing circuits the proper character has been selected on the type band and the proper tier shift has been made, the solenoid 266 of the hammer mechanism is energized as above described. The hammer is then projected forwardly to strike the material P. In the forward movement of the hammer, the switch 270 is actuated to break the contacts 271 and to establish the circuit through the contacts 272. As will be apparent from an inspection of Figure 44, breaking the contacts at 271 breaks the entire power circuit to the keyboard and thus the hold-down magnet 55 is de-energized and the character key 51 returns to its normal elevated position under influence of the spring blade 61.

The circuit made by the contacts 272 passes therefrom through the line 325 to terminal 326 on the line 327 which connects to the solenoid 133 through the windings of said solenoid to terminal 328 on the return line 309. When this solenoid is energized, the cam 117 is restored to its initial inoperative position and therefore the contacts of the switch 195 are opened. The line 327 also connects to the solenoid 128 and the circuit is through said solenoid and out to the terminal 329 on the return line 309. When the solenoid 128 is energized it elevates the arm 115 thus bringing it back to its normal, inoperative position.

After the imprint has been made by the hammer and the main power circuit to the keyboard has been broken, the magnetic coil 243 which controls movement of the directional lock pin 238 is de-energized. Under influence of the spring 244 the lock pin tends to move to its normal elevated position. This movement brings the switch actuating member 248 into engagement with the switch 245 and closes the same thus establishing a circuit through the line 330 to the directional solenoid 236 and energizes the same which therefore effects restoration of the type wheel to its initial or starting position. This circuit remains closed during the time required for the lock plate 204 to return to initial position, whereupon the directional lock pin 238 engages in the notch in said lock plate. The member 248 then passes the switch 245 permitting it to open and thus immediately breaking the circuit to the solenoid 236.

Figure 44 also discloses diagrammatically the circuits controlled by the space bar 66. The first blade 335 is connected to the main power line through the line 336, the contacts 192 of the switch 189 to the contact 271 of the switch 270 associated with the hammer operating mechanism. Since the space bar is, of course, operated only to provide space between words, the hammer will be in its retracted position and hence the contact 271 will be closed thus establishing the power circuit to the space bar.

The second blade 337 is connected at terminal 338 to the line 306 which leads to the first of the group solenoids 121. As will be pointed out when the wiring diagram shown in Figure 46 is described, the blade 337 of the space bar may be connected to any one of the solenoids 121 by manually closing a selected one of the switches 185. The purpose of this is to provide for varying the space between words whenever desired. The third blade 339 is connected to a hold-down magnet 340 and also through the line 341 to the solenoid 186, through the windings of said solenoid and out to the terminal 342 on the return line 309.

When the space bar is depressed the foregoing circuits are closed and movement of the carriage is effected as follows: The group solenoid 121 being energized moves the selected cam 117 into position which closes the switch 195, thus energizing the solenoid 124 which moves the arm 115 downwardly until the contact piece 116 engages the cam 117. This movement causes rotation of the friction wheel 107 with a corresponding movement of the carriage.

The solenoid 186 being energized by depression of the space bar causes movement of the core 187 which first opens the switch 313 to break the circuit to the solenoid 124. At the same time, the yoke 191 moves the contact 190 on the contact 192 until the said contact 190 also engages the contact 193. It is important that the contact 190 engage both contacts 192 and 193 for a brief instant, otherwise the power circuit would be broken and the space bar would not function. When the contact 190 has cleared contact 192, the circuit to the space bar is broken and it returns to normal, inoperative position. When contact is made between 190 and 193, the circuits are completed to the lifting solenoid 128 and the retracting solenoid 133 which function to raise the arm 115 and withdraw the cam 117, respectively. Also, the circuit to the space bar being broken, the solenoid 186 is de-energized and the core 187 returns to initial position under influence of the spring.

The vacuum dash-pot associated with the solenoid 186 may be adjusted to offer more or less resistance to the movement of the core 187, and, hence, regulate the time of opening and closing of the switches, as above described. This timing mechanism is an important feature of our machine and enables the spacing mechanism to function quickly and accurately.

In Figure 45 we have shown a wiring diagram for six character keys on the keyboard. These keys have been selected so that we may show the operative connection from all of them to a single one of the stop pins 252. By referring to Figure 40, it will be seen that the letter "P" is the tenth letter to the right of the center of the type-band and the letter "J" is the twelfth letter to the left of the center of the type-band. Hence, the type wheel will be held in position for the printing of the letter "P" when the wheel has been rotated to the right, as shown in Figure 23, so that the opening 251 in the lock plate 204 engages the tenth stop pin counted from right to left. To present the letter "J" in position for printing, the type wheel will be rotated to the left until the opening 250 engages the twelfth stop pin counted from left to right. Hence, the characters "P" and "J" control the same stop pin.

The circuits for the letters "P" and "J", which are taken by way of example, are shown in Figure 45. In the said figure, the reference numeral 301 again indicates the incoming power line which is connected to the second switch blade operated by each of the character keys. It is understood, of course, that the incoming power line goes through the hammer circuit as described in connection with Figure 44 and it is deemed unnecessary to show this part of the circuit in the present diagram.

The third contact blade of each key is that which establishes the circuit to the group solenoids 121. The key for the lower case letter "j" closes the circuit to the first of the series of group solenoids 121 through the connecting line 350 and the actuation of this solenoid will cause a movement of the carriage corresponding to the movement required for letters and characters of group 1. Similarly, the small capital "J", being also a letter of the first group, is connected through the line 351 to the first of the group of solenoids 121. The lower case letter "p" is a letter of the second group and is connected to the second solenoid 121 through the line 352. The large capital "J" and small capital "P" are both letters of the second group and are connected, respectively, through lines 353 and 354, to the second solenoid of the group 121. The large capital "P" is a letter of the third group and is connected to the third solenoid 121 through the line 355. The foregoing will, it is believed, make clear the connection of the keys to the group solenoids which actuate the group cams for controlling the extent of movement of the carriage to position the material for receiving the imprint of a selected character.

All of the six keys given by way of illustration in this wiring diagram operate on the same stop pin 252 and are therefore operatively connected to the solenoid 256 which actuates the said stop pin. The electrical connection to the solenoid 256 is through the line 310 to the fourth switch blade of each of the character keys.

Since the letter "J" is on the right side of the center of the type-band, it is evident that the type-band must be rotated to the left in order to bring the letter "J" in position for printing. Therefore, the directional magnet 236 must be energized. The circuit for the directional magnet 236 is traced from the fifth switch blade of each of the character keys "J" through a line 357 to the solenoid 243 which acts as a relay and closes the switch 246 thereby completing the circuit to the directional magnet 236.

The letter "P" is located to the left of the center of the type-band and consequently the type-band must be rotated to the right to position this letter for printing. This is accomplished by energizing the directional magnet 237. The circuit for this magnet is traced from the fifth switch blade of each of the character keys "P" to the line 358 which connects with the other of the solenoids 243 which acts as a relay for the directional magnet 237. When the solenoid 243 is energized, the other switch 246 is closed, thereby closing the circuit to the directional magnet 237.

It is understood, of course, that the lower case letters are located in tier No. 1 on the type-band, the large capitals in tier No. 2, and the small capitals in tier No. 3. Therefore, we have shown in this figure the circuits for operating the tier-shift mechanism to elevate the type wheel to bring the required tier into position for printing. No vertical movement of the type wheel is required for the lower case letters since tier No. 1 of the type-band is always in position for printing.

The large capital letters "P" and "J" are connected to the magnet 225 of the relay 224 through a line 359 which connects with the hold-down magnet of each of these keys. The magnet 225 being energized, closes the contacts to the lift magnet 215 and the locking magnet 223. Thus the type wheel is raised to its intermediate position for printing characters from the second tier and is held in such position by engagement of the locking member 218 in the notch 216 in the spindle 208.

The small capital letters "P" and "J" are connected to the magnet 226 of the relay 224 through a line 360 which connects with the hold-down magnet of each of these keys. When the magnet 226 is energized, the circuits for the lift magnet 215 and the locking magnet 221 will be closed. Thus the type shuttle will be elevated to place the third tier of the type-band in position for printing and will be held in such position by engagement of the lock member 217 in the notch 216 of the spindle 208.

The foregoing description will, it is believed, make it clear how six character keys may be operated to actuate the same stop pin 252 to lock the type wheel in position for printing a selected one of the six characters. Since the keyboard is provided with 126 character keys, it follows that only 21 stop pins will be required.

In Figure 46 we have shown a complete wiring diagram for five character keys and the space bar with the connections from these parts to the several mechanisms of the machine. The particular character keys have been selected with the view of showing in this wiring diagram all of the various movements of the carriage and of the character selection mechanisms.

As in Figure 44, the source of power is here indicated by the reference numeral 300 and the incoming power line to the machine is designated by the reference numeral 301. The incoming power line leads from the source of power to the switch 270 of the hammer mechanism through the contacts 271 thereof and thence to the second switch blade of each of the character keys. The line 301 also leads to the switches 245 and 246 and the relay 224, as is clearly shown by the heavy line in this figure.

We will first consider the upper one of the character keys shown to the right of Figure 46 which is the key controlling the small letter $i$. This letter belongs in group No. 1 and is located in tier No. 1 on the type-band and to the left of the center thereof. The circuits controlled by this character key are traced as follows: Since this letter is in tier No. 1 of the type band, the tier-shift mechanism is not employed and hence, the lead from the hold-down magnet 55 is to the return line 309. The third switch blade leads by the line 365 to the upper one of the group solenoids 121 shown to the left of Figure 46. This solenoid is the one which controls the movement of the carriage for all letters and symbols in group No. 1. This circuit is completed through the windings of the solenoid and out to the return line 309 at terminal 366.

The fourth switch blade closed by depression of the character key $i$ leads to the solenoid 255 which controls the upper one of the stop pins 252.

The fifth switch blade of the character key $i$ leads by the line 367 to the solenoid 243 at the left of the wiring diagram which closes the switch 246, thus closing the circuit to the directional solenoid 237, the action of which is to rotate the type wheel to the right, thus bringing the character $i$ into position for printing.

The next two character keys O and M, being small capitals, bring into action the case-shift mechanism by which the type wheel is elevated to its uppermost position to present the character of tier No. 3 in position for printing.

The second switch blade of each of these keys is connected to the power line as heretofore described. The third switch blade of the key O leads by the line 368 to the second one of the group solenoids 121 which is the solenoid for controlling the movement of the carriage for letters or symbols in group No. 2. The third switch blade of the character key M leads by the line 369 to the third one of the group solenoids 121 which controls the movement of the carriage for characters or letters in group No. 3.

The fourth switch blade of each of these keys, O and M, leads to the magnet 256 for the associated stop pin, it being understood that these particular keys operate different stop pins.

The letter O, being located to the right of the center of the type-band, requires rotation of the type-band to the left to present this letter in position for printing. Hence, the fifth switch blade of the key O is connected to the magnet 243 at the right in Figure 46 which closes the associated switch 246, thus energizing the directional solenoid 236. The letter M being located at the left of the center of the type wheel, requires that the wheel be rotated to the right. Hence, the fifth switch blade of the key M is connected to the electromagnet 243 at the left in this figure which controls the circuit for the directional solenoid 237.

As heretofore stated the two keys now under discussion represent small capital letters which are located in the third tier on the type band and therefore the tier-shift mechanism is brought into play. The electromagnets 55 of each of these keys lead by a line 370 to the magnet 226 of the relay 224. Actuation of the relay 224 closes the circuit to the left magnet 215 and also to the magnet 221 which actuates the lock member 217. By this arrangement the spindle 208 is elevated until the lock member 217 engages in the notch 216 in the spindle.

The next two keys shown in the wiring diagram are the large capital letters D and W which are therefore located in the second or center tier of the type band. Both of these characters are located to the right of the center of the typeband and hence they will be controlled by the same directional solenoid. The letter D belongs in group No. 4 while the letter W belongs in group No. 5, and, therefore, they will actuate different solenoids of the group solenoids 121. Thus, the third switch blade of the key D leads by the line 371 to the fourth one of the group solenoids 121 which controls the movement of the carriage for letters or characters constituting group No. 4. The fourth switch blade of the key D leads to the magnet 256 which controls the action of the stop pin for this character. The fifth switch blade is connected to the electromagnet 243 at the right in this figure which actuates the switch 246 to close the circuit for the directional solenoid 236.

The third switch blade of the key W leads by the line 372 to the fifth or last one of the group solenoids 121 which controls the movement of the carriage for letters or characters constituting group No. 5. The fourth switch blade of this key leads to the magnet 256 which operates the associated stop pin for this character. Since the letter W is upon the same side of the center of the type-band as the letter D, the fifth switch blade of this key will be connected to the same electromagnet 243 which closes the switch 246 thus energizing the directional solenoid 236.

The hold-down magnets 55 of the keys D and W lead by a line 373 to the magnet 225 of the relay 224. When this magnet is energized the circuit is closed to the lift magnet 215 and also to the magnet 223 which actuates the lock member 218. Thus, the lift magnet elevates the type wheel spindle 208 until the lock member 218 engages in the notch 216.

It is believed that the foregoing description of the circuits controlled by five selected keys of the keyboard will serve to make clear this part of our invention. From this description it will be seen that each key is provided with switches which control the making of circuits for the group solenoids, the stop pins, the lift magnet and the directional solenoids. These are the essential parts of the machine operated directly by depression of a key on the keyboard.

The circuits from the space bar 66 are shown in Figure 46 in identical manner as they are shown in Figure 44. Hence, it is believed unnecessary further to describe the space bar circuits and their operation. We have, however, shown in this figure a plurality of manually operated switches 185 by actuation of which the space bar may be electrically connected to any one of the group solenoids 121. The purpose of this arrangement is to provide for variation of the spacing between words in accordance with requirements. These switches are in the line 306 which is connected to the second switch blade of the space bar.

Fig. 46 also shows the circuit to the hammer solenoid 266 which is established by closing of the switches 259 actuated by the respective stop pins 252. Furthermore, it will be clear that when the contacts 271 of the switch 270 are opened, the main power circuit of each of the keys will be broken and thus the hold-down magnets will be deenergized. Thereupon, the keys will return to their normal elevated position through the influence of the upper switch blade which acts as a spring. Therefore, the switches controlled by the character keys are all opened, which results in the opening of the circuits to all those parts of the machine which are connected to the keyboard.

When the keyboard circuits are broken, the relay 243 is de-energized and the directional lock pin, 238 or 239, returns to its upper position in engagement with the notch in the edge of the lock plate 204. During this movement of the directional lock pins, the switch-actuating member 248 will close the switch 245, which is directly connected in the main power circuit, with the result that the other one of the directional magnets, 236 or 237, is energized to rotate the type wheel and restore it to initial position.

Breaking the keyboard circuits also breaks the circuits controlled by the relay 224. Therefore, the magnets 225 and 226 and the locking magnets 221 and 223 are de-energized, as is also the lift magnet 215. The type wheel is then free to drop by gravity to its normal position with tier No. 1, containing the lower case letters, in position for printing.

The switch 270 operated by the hammer also controls the circuits for the carriage movement mechanism. When the contacts 272 are closed, a circuit is established by the line 325 to line 327, thereby energizing the return solenoid 133 and also the magnet 128. The return solenoid operates to restore the cams 117 to their initial position and the magnet 128 raises the arm 115 to its upper or inoperative position.

Thus, movement of the hammer and its actuation of the switch 270 serves accurately to time the movements of the carriage mechanism and the character selection mechanism.

In Fig. 47 we have illustrated a modification of the carriage actuating mechanism which may be adopted in lieu of that heretofore illustrated and described. This modification we shall, for convenience, refer to as the "movable center" type of the mechanism because it depends upon a movable center for adjustment of the carriage movement for variations in the set-size of the type employed.

In Fig. 47 the parts of the carriage mechanism illustrated are the same as those heretofore described and it will therefore be sufficient now to give the details of the modified mechanism.

As in the preferred embodiment of the invention, the friction wheel 107 is operated by means of the friction grab 109 and a second friction grab 113 is provided to prevent reverse rotation of the wheel. It will be noted that the friction wheel 107, shown in Fig. 47, rotates in a direction opposite to that shown in Fig. 19. Hence, the friction grab 113 in Fig. 47 is in inverse position compared to the grab 113 in Fig. 19 and the spring tends to pull upwardly in Fig. 47 and not downwardly as in Fig. 19. In the present modification, the friction grab 109 is actuated by a lever 400, the opposite end of which passes through a slot in a core 401 of a solenoid 402. Intermediate the ends of the lever 400 is provided a center bearing 403 secured to a block 404 slidable on a fixed pedestal 405. The rod 406 extends through the side frame of the machine and is provided at its end with a knurled knob 407 by which the said rod may be rotated.

The core 401 is provided at its upper extremity with a stop 408 adapted to engage one of a selected series of cams 409, these cams corresponding to the group cams 117 of the embodiment heretofore described. These cams 409 are actuated by group solenoids 410 which correspond to the group solenoids 121 of the principal embodiment of the invention and operate in the same manner to project a selected one of the cams 409 into the path of movement of the core 401.

In operation, when the solenoid 402 is energized the core 401 will move downwardly as viewed in Fig. 47 to the position indicated in dotted lines therein. Downward movement of the core is limited by engagement of the stop 408 with the selected one of the cams 409 which has been projected into operative position by actuation of a solenoid 410, the circuit of which is controlled by depression of a key on the keyboard. Downward movement of the core 401 causes a swinging movement of the lever 400 about the center 403 and consequently, the opposite end of said lever will cause upward movement of the friction grab 109 resulting in a corresponding movement of the friction wheel 107 in the direction of the arrow in Fig. 47.

Provision is made in this modification for varying the movement of the friction wheel, and consequently movement of the carriage, in accordance with the set-size of the type employed. In the main embodiment of the invention this adjustment is effected through actuation of the arm 136 on the quadrant 137. In the present case adjustment for set-size is accomplished by moving the center 403. As will be clear from Fig. 47 the center 403 may be moved either to the right or to the left by manipulation of the knurled knob 407. Movement of the center to the right will cause an increased movement of the friction grab 109 relative to the movement of the core 401 whereas movement of the center to the left will cause a corresponding decrease in the movement of the friction grab 109 with respect to the movement of the core 401. In order to position the center 403 at the proper point for any set-size type employed, the knurled knob 407 may be provided with a graduated disk 411 which will indicate the position of adjustment of the center for the desired set-size. Thus, the movable center principal employed in this embodiment may be substituted for the arm 136 and quadrant 137 of the principal embodiment for accomplishing the same result, namely, adjustment of the carriage movement in accordance with changes of the set-size of the type employed.

In Figs. 49, 50 and 51 we have illustrated a modification in the electric switch mechanisms and circuits controlling the carriage movement.

In the principal embodiment of our invention heretofore described, the keyboard circuits and the circuits controlling the movement of the carriage, except the space bar circuit, are broken by action of the hammer. In the present modification, the circuits are so arranged that the interruption thereof is effected through switches operated mechanically by movement of the carriage actuating mechanisms.

It will be understood that the friction wheel 107 and the principal associated parts have not been changed and that the group cams 117 and group solenoids 121 remain the same. Also the solenoid 133 functions in the present modification to restore the depressed cam to initial position. The modified structure includes a switch 420 suitably supported on the bed plate of the machine as clearly shown in Fig. 49. This switch has one blade which is directly connected to the main power line of the machine and operates, when closed, to complete the power line circuit as will hereinafter be more fully described. The switch 420 is actuated by a mechanism which includes an actuating yoke or rocker frame 421 which is designed to close the said switch by swinging movement and to permit the said switch to open when the yoke is restored to its initial position.

To cause swinging movement of the yoke 421 we have provided a cam 422 associated with the limit stop 116 and which during the downward movement of said limit stop causes actuation of a follower 423 which moves an actuating member 424. The said actuating member is restored to its inoperative position by the action of a retracting spring 425, and the yoke 421 is returned to normal position by upward movement of the arm 115. A flat spring 426 cooperates with an oblique surface on the yoke 421 to hold it in operative position, as shown in Fig. 50.

In Fig. 49 the switch 420 is shown in its open position and the yoke 421 in its inoperative position. In Fig. 50, the yoke 421 has been actuated to close the said switch 420, this actuation taking place when the limit stop 116 moves downward to contact with the selected one of the group cams 117.

On the base of the machine we have provided another switch designated by the reference numeral 430 which comprises a center contact blade 431 and outer contact blades 432 and 433. This switch is operated by the armature 434 of magnet 435, suitably supported on the bed plate of the machine.

Another switch is associated with the core of the retracting solenoid 133 and is designated in the drawings by the reference numeral 436. The lower blade of the said switch is made of spring metal and is provided with a spacing element 437 which cooperates with a similar element 438 on the core of the said solenoid to maintain the switch 436 open. When the said core moves forward by reason of the forward movement of a selected one of the group cams 117, the spacing element 438 moves out of engagement with the element 437 thus permitting said switch 436 to close as shown in Fig. 50.

With the foregoing structure in mind it is believed that the modified circuit illustrated diagrammatically in Fig. 51 will be clearly understood. In this wiring diagram so much of the circuit and such of the mechanical elements as have not been changed are designated by the same reference numerals by which they are designated in the main wiring diagram Fig. 46. The source of power is designated by the reference numeral 300 and the main power line 440 leads from the source of power to terminal 441 of the switch 420. A branch of said power line leads from terminal 441 to the blade 431 of the switch 430. The circuit is complete through the blades 431 and 432 to the switch 195 and also by the line 442 to the second blade of the space bar 66.

The wiring diagram, Fig. 51 shows the switches hereinbefore referred to and the circuits controlled thereby in open position, that is to say when the carriage is in its initial position and before it moves to present the paper or other material for the reception of the imprint of the type faces on the type wheel. When now one of the cams 117 is actuated in the manner heretofore described, that is to say by energization of a selected group solenoid 121, the said cam will close the switch 195 which energizes the solenoid 124 to draw the arm 115 downwardly until the contact piece 116 engages the surface of the cam 117. As a result of this downward movement of the arm 115 the switch 420 will be closed. This will complete a circuit from the main power line through the said switch 420 and by the line 443 to the magnet 435.

When the selected cam 117 has been moved into position, the core of the retracting solenoid 133 is also moved thus breaking the contact between the spacing elements 437 and 438. Thereupon the switch 436 is immediately closed. As will be seen from the wiring diagram, Fig. 51, one blade of the switch 436 is connected by the line 444 which branches from the line 443 connected to the switch 420. The other blade of the switch 436 is connected by the line 445 to the blade 433 of the switch 430. Hence, the circuit through the switch 436 will not be complete until the magnet 435 has been energized to establish contact between the blades 431 and 433 of the switch 430.

Closing of the switch 420 by downward movement of the arm 115 and associated mechanisms energizes the magnet 435 so that its armature is actuated to close the contacts 431—433 and break the contact between 431 and 432. Thus the circuit to the solenoid 124 is broken. At the same time, the circuit is complete from the switch 430 to the switch 436, completing the circuit to the retracting solenoid 133 and the lifting solenoid 128. The core of the retracting solenoid then moves to the left in Fig. 51, but the circuit to the magnet 435 is maintained intact from the switch 436 until the spacing elements 437 and 438 engage to open the said switch 436. Thereupon the magnet 435 is de-energized and contact between the blades 431 and 432 again established.

Thus, by the present arrangement the circuits are controlled by the switch 436 and the functioning of the several parts of the carriage movement mechanism are accurately timed by the opening and closing of the said switch and its actuation of the switch 430 associated with the magnet 435. In other words, control of the carriage movement mechanism is effected through switches operated by the mechanical movements of the carriage mechanism as distinguished from the movement of the hammer mechanism in the case of the principal embodiment of the invention.

In Figs. 52 to 57, inclusive, we have shown diagrammatically the relative positions of the several essential parts of our machine, namely, the carriage, the type wheel and the hammer. Since the material upon which the imprints are made is moved by the carriage, it is deemed sufficient for the purposes of this diagrammatic showing to indicate the material, alone, it being understood that its movement is governed by movement of the carriage. A study of these figures in the light of the foregoing description will make clear the cooperation of the several mechanisms in the production of the imprints of type characters spaced in accordance with their width.

Figure 52:
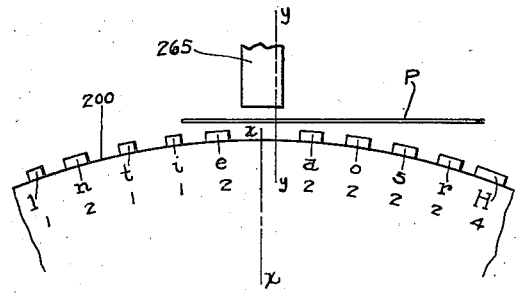

In Fig. 52, the reference numeral 265 indicates, as heretofore, the hammer; numeral 200, the type wheel; and the reference character P, the material which receives the imprints of the type characters on the type wheel. Only so much of the type wheel is shown as is necessary for the purposes of the present description. The size of the type characters has been somewhat exaggerated but the proportion has been maintained and the group in which each of the characters is classified is indicated, in Fig. 52, immediately below the character designation. In Fig. 52 the parts referred to are shown in their normal relative position. The line x—x indicates the center line of the type wheel and the line y—y is an imaginary line with reference to which the type wheel and the material are moved. The position of the line y—y is more or less arbitrarily determined as a matter of convenience and it can be readily appreciated after the following description has been made, that the lines x—x and y—y might coincide and be, in fact, one and the same line. A group distance is measured from the imaginary line y—y and this line also determines the printing position of the type characters on the type wheel.

Figure 53:
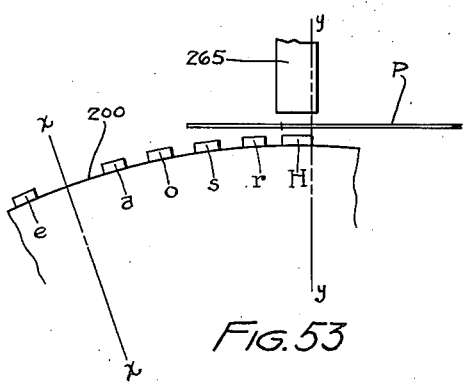
Figure 54:
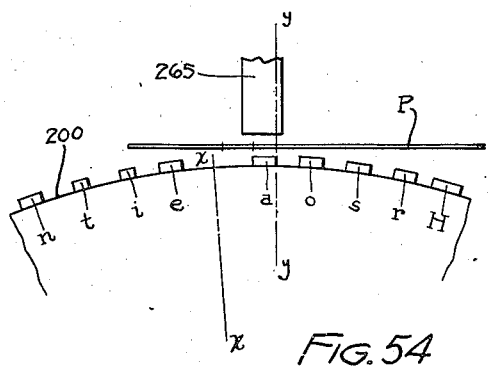

For purpose of illustration, we have shown in the successive views, Figs. 53 to 57, the changes in position of the several parts for the printing of the word "Haste". Assuming, now, that the parts are in the normal position shown in Fig. 52, the key on the keyboard corresponding to the type character "H" is depressed. Thereupon, the material P moves to the left as viewed in Fig. 53 a distance equal to the width of the group in which the letter "H" is classified, that is to say, the distance for group 4. Simultaneously, the type wheel is rotated to the left so that the center line x—x is in the position shown in Fig. 53 until the stop pin 252, controlled by the letter "H", stops rotation of the wheel when the right margin of the type character is in alinement with the line y—y. In Fig. 53 the material has been moved to the left and the type character "H" is in position. The hammer then moves forward to make the imprint and thereupon the type wheel returns to the normal position shown in Fig. 52.

The next letter of the word is "a". The key on the keyboard corresponding to this character is depressed resulting in a movement of the material P to the left a distance equal to the group distance for this character, that is to say, group 2. Simultaneously the type wheel is rotated and is stopped by the stop pin 252 which is controlled by the character "a" when the right margin of the type character is in alinement with the line y—y. The material and the type wheel are therefore in position for the printing of the letter "a" and the hammer moves forward to make the impression. When the impression is made the type wheel again returns to the normal position shown in Fig. 52.

Figure 55:
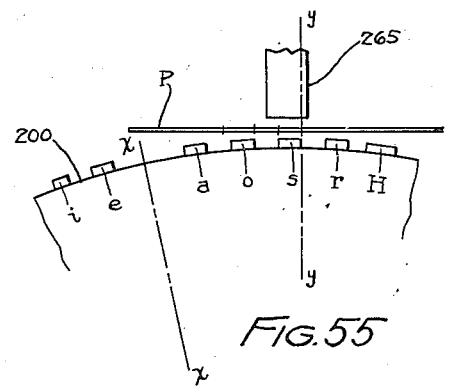
Figure 56:
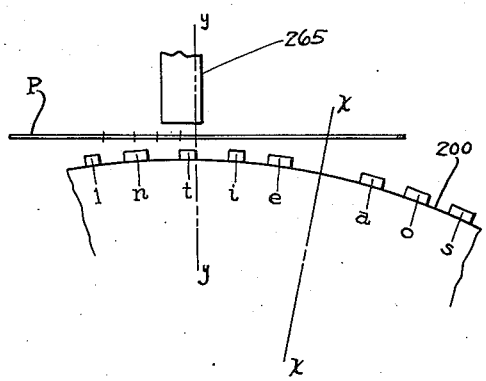
Figure 57:
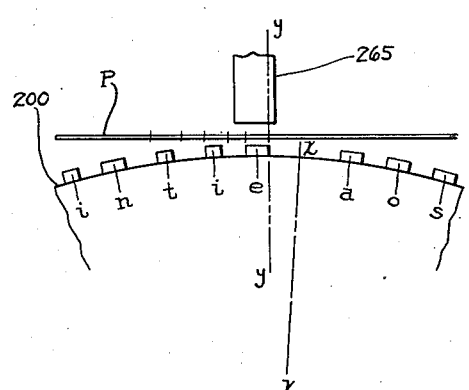

The following Figs. 55, 56 and 57 show the position of the parts for the printing of the succeeding letters of the word "Haste" namely the letters "s" "t" "e". The position of the imprint upon the material P has been indicated by short lines in the several figures. By inspection of Fig. 57 it will be seen that for each of the letters making up the word "Haste" the carriage has been moved a distance corresponding to the width of said characters and thus the imprint of the word is so made that space is provided for each character in accordance with its width.

The foregoing illustrations will, it is believed, make clear the essential feature of our machine which is the provision of variable spaces for the different characters. Normally the parts are in a predetermined position and as the successive imprints are to be made, the material and the type wheel are simultaneously brought into printing position, the said position being determined by reference to a conveniently selected imaginary line y—y.

It is believed that the foregoing description of the construction and operation of our machine will make the invention clear to those skilled in the art. It will be seen that we have provided an all automatic, all electric machine which will produce variable spaced imprints of the character units uniformly spaced upon a type wheel. With our machine the character space provided by movement of the character varies in accordance with the width of the character printed and, therefore, all the letters of a word will be uniformly spaced.

The provision of a friction drive for moving the carriage permits graduated movement in thousandths of an inch with absolute accuracy which could not practically be accomplished by other carriage mechanisms depending for their operation upon escapements involving racks and cams for similar devices.

Our machine is flexible in operation in that provision is made for interchangeability of type characters and set-size of type accompanied by corresponding variation in the movement of the carriage.

As heretofore stated, our machine is particularly designed for producing the so-called "Master Sheet" described in the aforementioned patent of Roy V. Graves. The "Master Sheet" described in the said patent is of translucent material and the composition is produced in opaque characters. With our machine, we contemplate using a perfectly transparent material coated with a composition which is easily removed by contact with the type faces. This will produce an opaque Master Sheet upon which the characters are perfectly transparent, thus being substantially the equivalent of a photographic negative.

The machine of our invention may be otherwise used than as above described. For example, plain paper may be provided and suitable carbon paper or inked ribbon interposed between the type faces and the paper so that the composition may be printed as it would be upon a typewriter or similar machine. It will be understood, therefore, that our machine is not limited to the particular uses referred to but that it will have a wide range of utility and application in the graphic arts.

We have designated our machine a "composing machine" because it is primarily intended to produce composition upon a master sheet which, by subsequent operations will be transferred to a printing plate. It is, therefore, to be understood that our composing machine is to be distinguished from other machines designated "composing machines", namely, the slug casting machines generally used in printing establishments.

While we have shown in the drawings and described in the specification a machine in which the type characters have been divided into five groups, it is to be understood that this classification of the type characters is a more or less arbitrary one and that we are not limited to the stated number of groups. A greater or smaller number of groups may be provided for and having shown how the machine will operate with five groups, it will be obvious to those skilled in the art how the circuits and mechanism will be arranged for a greater or smaller number of groups.

The removability of the keyboard, as a unit, from the body of the machine is a very important feature of our invention. With this arrangement it is possible to locate the keyboard and the other part of the machine in entirely different and separate places. Moreover, a single keyboard may be provided for operating any desired number of machines which may be located in widely separated places. This is of great advantage particularly in newspaper printing establishments because a single operator may by manipulating a single keyboard produce any number of master sheets in widely separated localities. Also, the machine of our invention may be used for intercommunication systems by electrically connecting a plurality of the machines each of which has a keyboard and a printing mechanism. By such an arrangement, an operator in one place may produce a printed message upon a machine located at another place and the receiver of said message may operate his machine to reply to said message at the place of origin. Numerous other uses of our machine will readily suggest themselves to those skilled in the art.

We claim as our invention:

1. In a machine of the character described, a type wheel provided with a font assembly of character units of various widths, the units of corresponding width constituting a group, a movable carriage for supporting material for receiving imprints of said character units, means for moving said carriage a distance equal to the widths of the group in which a selected character unit is classified to position said material for receiving the imprint of said selected character unit, spacing means, and means for selectively operatively connecting said spacing means to said carriage for providing space between character units or words equal to the width of any of said groups.

2. In a machine of the character described, a type wheel provided with a font assembly of character units of various widths, the units of corresponding width constituting a group, a movable carriage for supporting material for receiving imprints of said character units, means for moving said carriage a distance equal to the width of the group in which a selective character unit is classified to position said material for receiving the imprint of said selected character unit, spacing means including a space bar selectively operatively connected to said carriage, and means actuated by operation of said space bar for moving said carriage to provide space between character units or words equal to the width of any selected group.

3. In a machine of the character described, a movable carriage for supporting material adapted to receive successive imprints of character units to form a line of print, a friction drive for moving said carriage, a clutch mechanism operatively connecting said friction drive to said carriage, a take-up drum for returning said carriage to initial position, and arbitrary actuatable means for operating said clutch mechanism to permit operation of said take-up drum.

4. In a machine of the character described, a type wheel provided with character units, a movable carriage for supporting material for receiving imprints of said character units, electric means for actuating said type wheel and for moving said carriage, a keyboard provided with a plurality of character keys corresponding to said character units, electric circuits connecting said character keys and said electric means, switches adapted to be closed by depression of said character keys for completing the circuits to said electric means, and electric means associated with each of said keys to maintain said switches closed for a predetermined time interval.

5. In a machine of the character described, a type wheel provided with a plurality of character units, a movable carriage for supporting material for receiving imprints of said character units, a hammer for producing imprints of said character units upon said material, electric means for actuating said type wheel, said carriage and said hammer, a keyboard provided with a plurality of character keys corresponding to said character units, electric circuits connecting said keys and said electric means, switches adapted to be closed by actuation of said character keys for closing the circuits to said electric means, and means operated by movement of said hammer for opening said switches.

6. In a machine of the character described, a type wheel provided with a plurality of character units, a movable carriage for supporting material for receiving imprints of said character units, a hammer for producing imprints of said character units upon said material, electric means for actuating said type wheel, said carriage and said hammer, a keyboard provided with a plurality of character keys corresponding to said character units, electric circuits connecting said keys and said electric means, switches adapted to be closed by actuation of said character keys to complete said circuits to said electric means, a magnet associated with each of said keys for maintaining said switches closed, and means operated by movement of said hammer for breaking the circuit to said magnets to permit said switches to open.

7. In a machine for producing imprints of type characters the width of which are in geometric ratio, a movable carriage for supporting material to receive such imprints, a plurality of character keys corresponding to said type characters, means operated by actuation of said character keys to move said carriage a distance equal to the width of the corresponding type character, and means for adjusting said last mentioned means to vary the distance traveled by said carriage in geometric ratio.

8. In a machine for producing imprints of type characters the width of which are in geometric ratio, a movable carriage for supporting material for receiving such imprints, a plurality of character keys corresponding to said type characters, means operable by actuation of said character keys to move said carriage a distance equal to the width of corresponding type character, and means for adjusting said last mentioned means to increase in geometric ratio the distance to be traveled by said carriage upon actuation of said keys.

9. In a machine for producing imprints of type characters the width of which are in geometric ratio, a movable carriage for supporting material for receiving such imprints, a plurality of character keys corresponding to said type characters, means operable by actuation of said character keys to move said carriage a distance equal to the width of corresponding type character, and means for adjusting said last mentioned means to decrease in geometric ratio the distance to be traveled by said carriage upon actuation of said keys.

10. In a machine for producing imprints of type characters the widths of which are in geometric ratio, a movable carriage for supporting material for receiving such imprints, a plurality of character keys corresponding to said type characters, means operated by actuation of said character keys to move said carriage a distance equal to the width of the corresponding type character, means for adjusting said last mentioned means to vary the distance traveled by the carriage in geometric ratio with respect to the width of the characters, and means operable to add an arbitrary constant to the distance to be traveled by said carriage upon actuation of said character keys.

11. In a machine of the character described, a plurality of character keys, a movable carriage, a friction wheel operatively connected to said carriage, a friction grab for rotating said friction wheel, and means operated by actuation of a selected character key to operate said friction grab to move said carriage.

12. In a machine of the character described, a plurality of character keys, a movable carriage, a friction wheel operatively connected to said carriage, a friction grab for rotating said friction wheel, means operated by actuation of a selected character key to operate said friction grab to move said carriage, and means for limiting movement of said carriage.

13. In a machine of the character described, a plurality of character keys, a movable carriage, a friction wheel operatively connected to said carriage, a friction grab for rotating said friction wheel, means operated by actuation of a selected character key to operate said friction grab to move said carriage, means for limiting movement of said carriage, and means for adjusting said limiting means to vary the travel of said carriage.

14. In a machine of the character described, a plurality of character keys, a movable carriage, means for driving said carriage, means selectively operable by actuation of said character keys to cooperate with said carriage driving means to limit the movement of said carriage in accordance with the width of the character selected, and means for simultaneously adjusting said limiting means to vary their limiting action.

15. In a machine of the character described, a plurality of character keys, a movable carriage, means for driving said carriage, a plurality of feed stops selectively operable by actuation of said character keys to cooperate with said carriage driving means to limit the movement of said carriage in accordance with the width of the character selected, and means for simultaneously adjusting said feed stops to vary their limiting action.

16. In a machine of the character described, a plurality of character keys, a movable carriage, means operatively connecting said carriage and said character keys to cause movement of said carriage when said keys are actuated, a plurality of normally inoperative feed stops adapted by operation of said character keys to be made operative to limit movement of said carriage, and means common to all of said feed stops for returning them to inoperative position.

ROY V. GRAVES.
AXEL J. BOHMAN.